US012573205B2

(12) United States Patent
Choi et al.

(10) Patent No.: US 12,573,205 B2
(45) Date of Patent: Mar. 10, 2026

(54) ELECTRONIC DEVICE AND METHOD FOR VEHICLE WHICH ENHANCES DRIVING ENVIRONMENT RELATED FUNCTION

(71) Applicant: THINKWARE CORPORATION, Seongnam-si (KR)

(72) Inventors: Ye Chan Choi, Seongnam-si (KR); Yo Sep Park, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 294 days.

(21) Appl. No.: 18/229,788

(22) Filed: Aug. 3, 2023

(65) Prior Publication Data
US 2024/0161514 A1 May 16, 2024

(30) Foreign Application Priority Data

Aug. 3, 2022 (KR) ........................ 10-2022-0096688
Aug. 3, 2023 (KR) ........................ 10-2023-0101855

(51) Int. Cl.
*G06V 20/58* (2022.01)
*B60Q 9/00* (2006.01)
(Continued)

(52) U.S. Cl.
CPC .............. *G06V 20/58* (2022.01); *B60Q 9/00* (2013.01); *G06V 10/267* (2022.01);
(Continued)

(58) Field of Classification Search
CPC .... G06V 20/58; G06V 10/267; G06V 10/757; G06V 10/7715; G06V 10/95;
(Continued)

(56) References Cited

U.S. PATENT DOCUMENTS

2008/0015743 A1 * 1/2008 Haug ........................ B60T 7/22
701/1
2014/0320655 A1 * 10/2014 Kim ........................ H04N 7/183
348/148
(Continued)

FOREIGN PATENT DOCUMENTS

JP 2019021027 A * 2/2019
KR 20160046440 A * 4/2016 ............ B60W 40/06

OTHER PUBLICATIONS

Chen, Hua-Tsung, Chun-Yu Lai, Chun-Chieh Hsu, Suh-Yin Lee, Bao-Shuh Paul Lin, and Chien-Peng Ho. "Vision-based road bump detection using a front-mounted car camcorder." In 2014 22nd International Conference on Pattern Recognition, pp. 4537-4542. IEEE, 2014. (Year: 2014).*

*Primary Examiner* — Carol W Chan
(74) *Attorney, Agent, or Firm* — WHDA, LLP

(57) ABSTRACT

According to an embodiment of the present invention, a method for controlling a vehicular electronic device comprises capturing an image in front of a vehicle, detecting a speed bump from the captured front image, obtaining information on the vehicle's location when the speed bump is detected, generating location information of the speed bump based on the obtained location information of the vehicle, determining whether the speed bump includes irregularities and generating speed bump information using at least one of information on whether the speed bump includes irregularities and information on a location of the speed bump, and transmitting the speed bump information to a vehicle service providing server. According to the present invention, an alarm is generated only when a speed bump ahead of the vehicle includes irregularities, thereby reducing user confusion.

18 Claims, 21 Drawing Sheets

(51) Int. Cl.

| | | |
|---|---|---|
| *G06V 10/26* | (2022.01) | |
| *G06V 10/75* | (2022.01) | |
| *G06V 10/77* | (2022.01) | |
| *G06V 10/94* | (2022.01) | |
| *G06V 10/98* | (2022.01) | |

(52) U.S. Cl.

CPC ........ *G06V 10/757* (2022.01); *G06V 10/7715* (2022.01); *G06V 10/95* (2022.01); *G06V 10/98* (2022.01)

(58) Field of Classification Search

CPC ......... G06V 10/98; B60Q 9/00; B60W 40/06; B60W 2420/403; B60W 2552/35; B60W 2556/45; B60W 2756/10; G06T 7/251; G06T 7/70

See application file for complete search history.

(56) References Cited

U.S. PATENT DOCUMENTS

| 2015/0046084 A1* | 2/2015 | Choi | ................... | G01C 21/3697 |
| | | | | 701/468 |
| 2019/0001965 A1* | 1/2019 | Cho | .................... | B60W 30/025 |

* cited by examiner

1000

100

VEHICULAR
ELECTRONIC DEVICE

WIRED/WIRELESS
COMMUNICATION
NETWORK

200

VEHICLE SERVICE
PROVIDING SERVER

300

USER TERMINAL (a)

Figure 20:
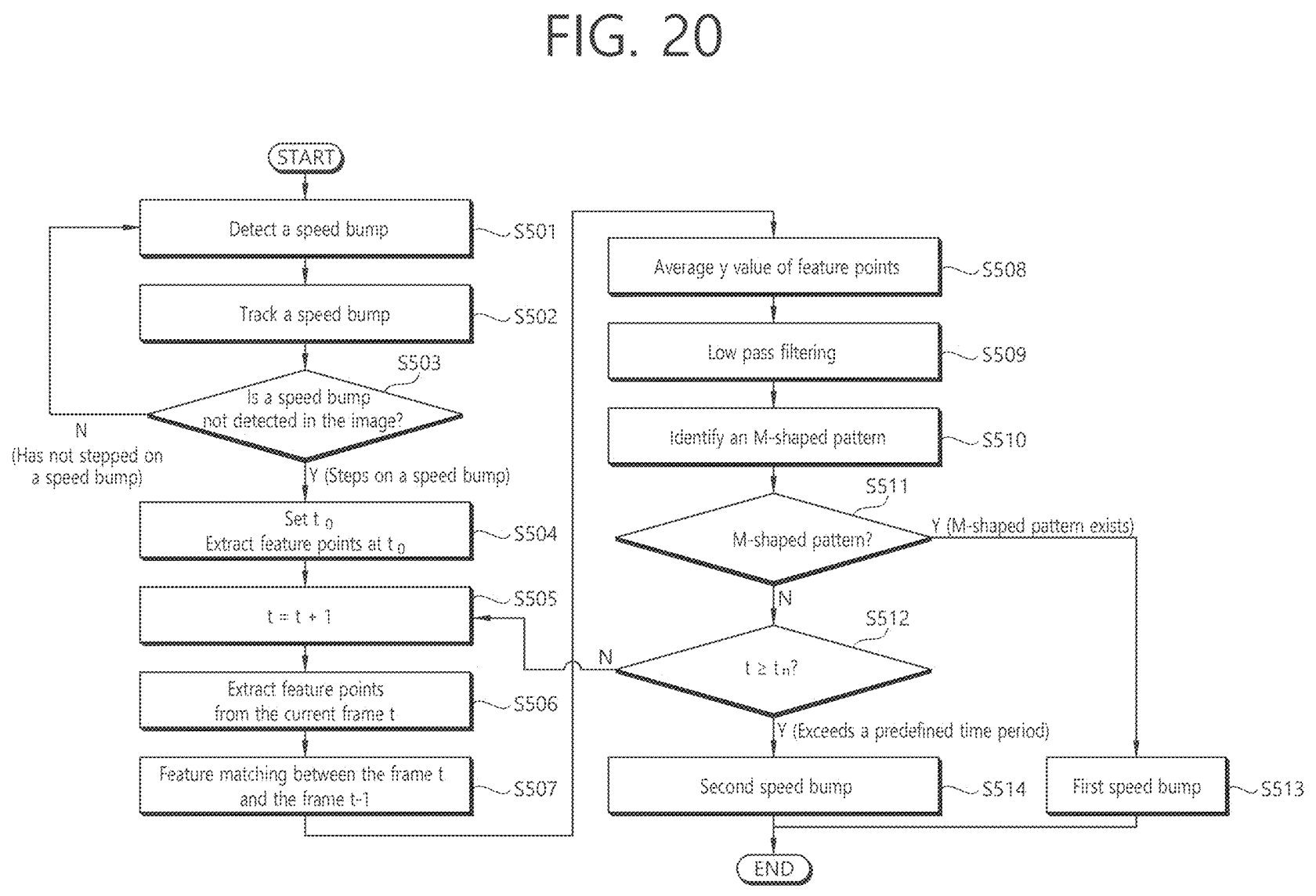

START

Detect a speed bump — S501

Track a speed bump — S502

S503 — Is a speed bump not detected in the image?

N (Has not stepped on a speed bump)

Y (Steps on a speed bump)

Set t₀ Extract feature points at t₀ — S504 t = t + 1 — S505

Extract feature points from the current frame t — S506

Feature matching between the frame t and the frame t-1 — S507

Average y value of feature points — S508

Low pass filtering — S509

Identify an M-shaped pattern — S510

S511 — M-shaped pattern?

Y (M-shaped pattern exists)

First speed bump — S513

N

S512 — t ≥ tₙ?

Y (Exceeds a predefined time period)

Second speed bump — S514

N

END

FIG. 21

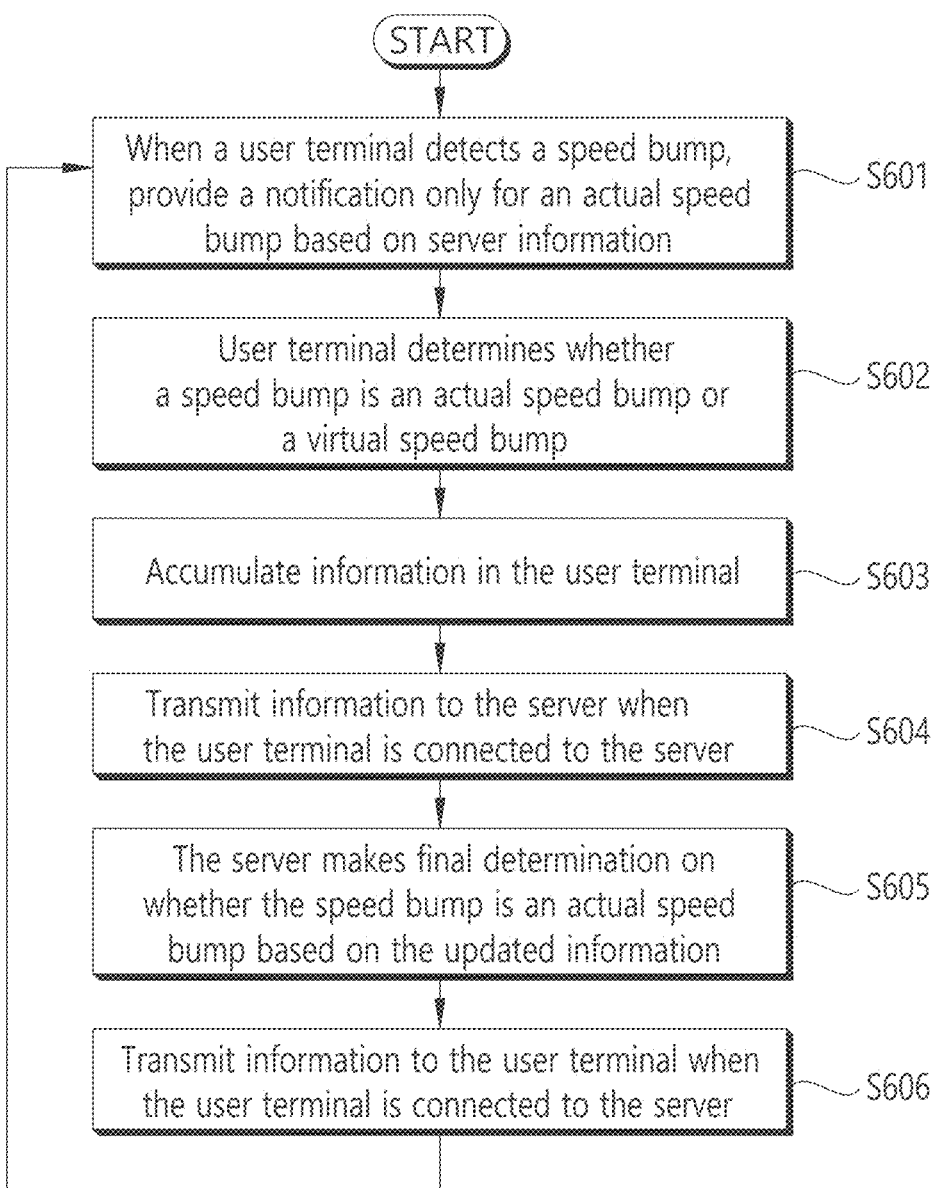

START

When a user terminal detects a speed bump, provide a notification only for an actual speed bump based on server information — S601

User terminal determines whether a speed bump is an actual speed bump or a virtual speed bump — S602

Accumulate information in the user terminal — S603

Transmit information to the server when the user terminal is connected to the server — S604

The server makes final determination on whether the speed bump is an actual speed bump based on the updated information — S605

Transmit information to the user terminal when the user terminal is connected to the server — S606

ELECTRONIC DEVICE AND METHOD FOR VEHICLE WHICH ENHANCES DRIVING ENVIRONMENT RELATED FUNCTION

TECHNICAL FIELD

The present disclosure relates to a vehicular electronic device and more specifically, to an electronic device and method for a vehicle that enhances a driving environment-related function.

BACKGROUND

The most important thing when driving a vehicle is safety and prevention of traffic accidents; to this end, vehicles are equipped with various auxiliary devices that perform vehicle pose control and function control of vehicle components and safety devices such as seat belts and airbags.

In addition, recently, it has become a common practice to mount devices such as black boxes in a vehicle to store driving images of the vehicle and data transmitted from various sensors for identifying the cause in the event of a vehicle accident.

Also, portable terminals, such as smartphones and tablets, are widely used as vehicle devices due to their capability to run black boxes or navigation applications.

SUMMARY

An object of the present disclosure is to provide a vehicular electronic device and a method for controlling the device that efficiently provides information to a driver by determining the authenticity of a speed bump.

Other technical objects of the present disclosure are not limited to those described above. Other technical objects not mentioned above may be understood clearly by those skilled in the art from the descriptions given below.

According to an embodiment, a method for controlling a vehicular electronic device is provided. The method comprises capturing an image in front of a vehicle, detecting a speed bump from the captured front image, obtaining information on the vehicle's location when the speed bump is detected, generating location information of the speed bump based on the obtained location information of the vehicle, determining whether the speed bump includes irregularities and generating speed bump information using at least one of information on whether the speed bump includes irregularities and information on a location of the speed bump, and transmitting the speed bump information to a vehicle service providing server.

According to an embodiment, a vehicular electronic device is provided. The device comprises a camera unit configured to capture an image in front of a vehicle, a sensor unit configured to determine the location of the vehicle, a processor configured to detect the speed bump from the image in front of the vehicle by processing the image, determine whether the speed bump includes irregularities after the vehicle passes the speed bump, and generate speed bump information using at least one of information on a location of the speed bump and information on whether the speed bump includes irregularities, and a communication unit configured to transmit the speed bump information to a vehicle service providing server.

Details of other embodiments are included in this disclosure and figures.

A vehicular electronic device and the method of controlling the vehicular electronic device according to an embodiment of the present invention provides one or more effects as follows.

A vehicular electronic device and a method for controlling the device according to an embodiment may determine authenticity of a speed bump.

A vehicular electronic device and a method for controlling the device according to an embodiment may generate an alarm only when a speed bump ahead of the vehicle includes irregularities, thereby reducing user confusion The effects of the present invention are not limited to the effects mentioned above, and other effects not mentioned will be clearly understood by those skilled in the art from the description of the claims.

BRIEF DESCRIPTION OF THE DRAWINGS

FIGS. 20 and 21 are flow diagrams illustrating a method for controlling a vehicular electronic device according to one embodiment.

DETAILED DESCRIPTION

In what follows, part of embodiments of the present disclosure will be described in detail with reference to illustrative drawings. In assigning reference symbols to the constituting elements of each drawing, it should be noted that the same constituting elements are intended to have the same symbol as much as possible, even if they are shown on different drawings. Also, in describing an embodiment, if it is determined that a detailed description of a related well-known configuration or function incorporated herein unnecessarily obscure the understanding of the embodiment, the detailed description thereof will be omitted.

Also, in describing the constituting elements of the present disclosure, terms such as first, second, A, B, (a), and (b) may be used. Such terms are intended only to distinguish one constituting element from the others and do not limit the nature, sequence, or order of the constituting element. Also, unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

The expression "A or B" as used in the present disclosure may mean "only A", "only B", or "both A and B". In other words, "A or B" may be interpreted as "A and/or B" in the present disclosure. For example, in the present disclosure, "A, B, or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

The phrase "at least one of A and B" as used in the present disclosure may mean "only A", "only B", or "both A and B". Also, the expression "at least one of A or B" or "at least one of A and/or B" may be interpreted to be the same as "at least one of A and B".

Also, the phrase "at least one of A, B and C" as used in the present disclosure may mean "only A", "only B", or "any combination of A, B and C". Also, the phrase "at least one of A, B, or C" or "at least one of A, B, and/or C" may mean "at least one of A, B, and C".

Figure 1:
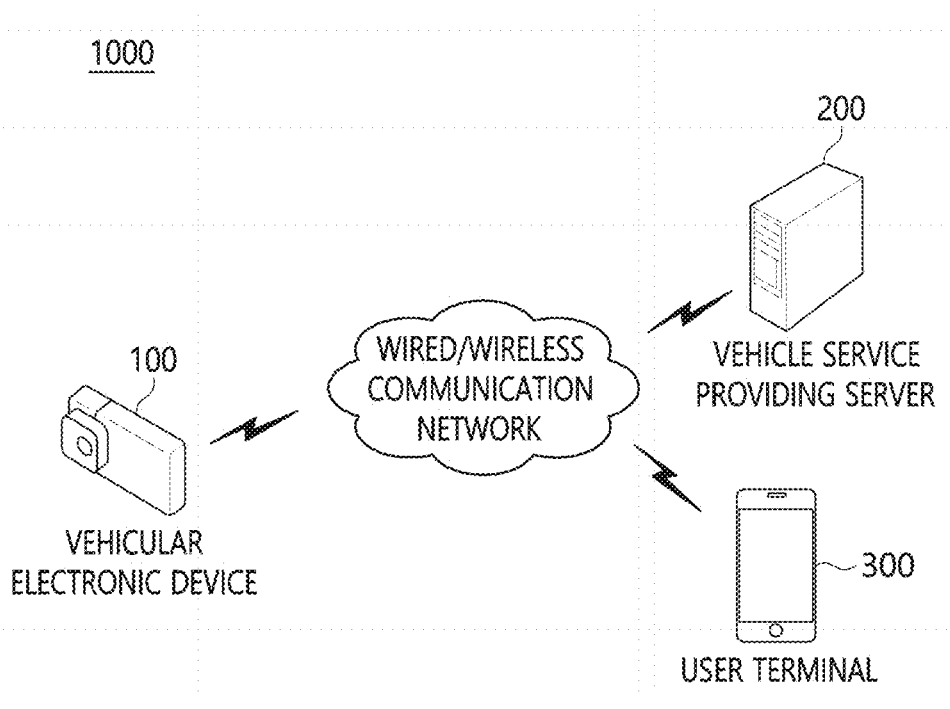
FIG. 1 is a conceptual structure of a vehicle service system according to one embodiment.

FIG. 1 is a block diagram illustrating a vehicle service system according to one embodiment.

In the present disclosure, a vehicle is an example of a moving body, which is not necessarily limited to the context of a vehicle. A moving body according to the present disclosure may include various mobile objects such as vehicles, people, bicycles, ships, and trains. In what follows, for the convenience of descriptions, it will be assumed that a moving body is a vehicle.

Also, in the present disclosure, a vehicular electronic device may be called other names, such as an infrared camera for a vehicle, a black box for a vehicle, a car dash cam, or a car video recorder.

Also, in the present disclosure, a vehicle service system may include at least one vehicle-related service system among a vehicle black box service system, an advanced driver assistance system (ADAS), a traffic control system, an autonomous driving vehicle service system, a teleoperated vehicle driving system, an AI-based vehicle control system, and a V2X service system.

Referring to FIG. 1, a vehicle service system 1000 includes a vehicular electronic device 100, a vehicle service providing server 200, and a user terminal 300. The vehicle service providing server 200 may access a wired/wireless communication network wirelessly and exchange data with the vehicle service providing server 200 and the user terminal 300 connected to the wired/wireless communication network.

Figure 2:
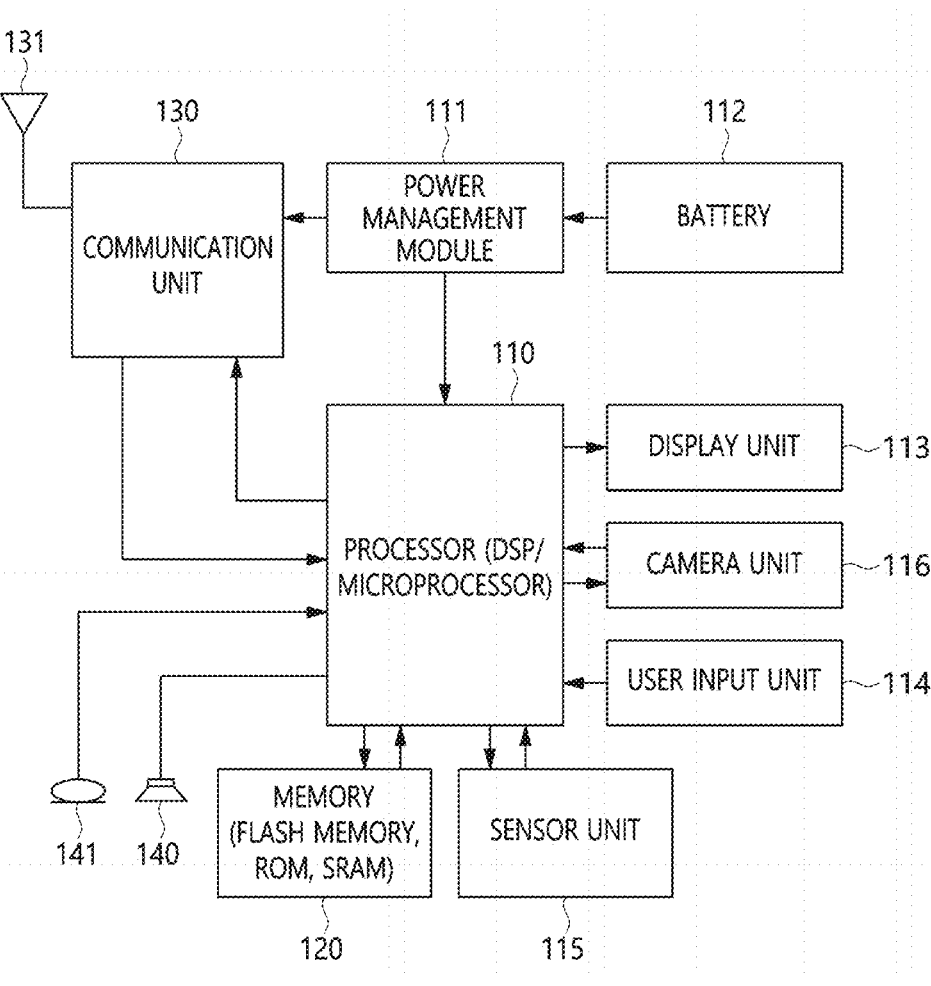
FIG. 2 is a block diagram illustrating a vehicular electronic device according to one embodiment.

The vehicular electronic device 100 may be controlled by user control applied through the user terminal 300. For example, when a user selects an executable object installed in the user terminal 300, the vehicular electronic device 100 may perform operations corresponding to an event generated by the user input for the executable object. The executable object may be an application installed in the user terminal 300, capable of remotely controlling the vehicular electronic device 100. FIG. 2 is a block diagram illustrating a vehicular electronic device according to one embodiment.

Referring to FIG. 2, the vehicular electronic device 100 includes at least a portion of a processor 110, a power management module 111, a battery 112, a display unit 113, a user input unit 114, a sensor unit 115, a camera unit 116, a memory 120, a communication unit 130, one or more antennas 131, a speaker 140, and a microphone 141.

The processor 110 controls the overall operation of the vehicular electronic device 100 and may be configured to implement the proposed function, procedure, and/or method described in the present disclosure. The processor 110 may include an application-specific integrated circuit (ASIC), other chipsets, logic circuits, and/or data processing devices. The processor may be an application processor (AP). The processor 110 may include at least one of a digital signal processor (DSP), a central processing unit (CPU), a graphics processing unit (GPU), and a modulator and demodulator (Modem).

The processor 110 may control all or part of the power management module 111, the battery 112, the display unit 113, the user input unit 114, the sensor unit 115, the camera unit 116, the memory 120, the communication unit 130, one or more antennas 131, the speaker 140, and the microphone 141. In particular, when various data are received through the communication unit 130, the processor 110 may process the received data to generate a user interface and control the display unit 113 to display the generated user interface. The whole or part of the processor 110 may be electrically or operably coupled with or connected to other constituting elements within the vehicular electronic device 100 (e.g., the power management module 111, the battery 112, the display unit 113, the user input unit 114, the sensor unit 115, the camera unit 116, the memory 120, the communication unit 130, one or more antennas 131, the speaker 140, and the microphone 141).

The processor 110 may perform a signal processing function for processing image data acquired by the camera unit 116 and an image analysis function for obtaining on-site information from the image data. For example, the signal processing function includes a function of compressing the image data taken from the camera unit 116 to reduce the size of the image data. Image data are a collection of multiple frames sequentially arranged along the time axis. In other words, the image data may be regarded as a set of photographs consecutively taken during a given time period. Since image data size is huge when the image data are not compressed, and significant inefficiency is caused when the image data are stored in the memory without compression, compression is performed on the digitally converted image. For video compression, a method using correlation between frames, spatial correlation, and visual characteristics sensitive to low-frequency components is used. Since a portion of the original data is lost from compression, the image data may be compressed at an appropriate ratio, as low as to yield sufficient identification of the traffic accident involving a vehicle. As a video compression method, one of the various video codecs, such as the H.264, MPEG4, H.263, and H.265/HEVC, may be used, and image data is compressed in a manner supported by the vehicular electronic device 100.

The image analysis function may be based on deep learning and implemented by computer vision techniques. Specifically, the image analysis function may include an image segmentation function, which partitions an image into multiple areas or slices and inspects them separately; an object detection function, which identifies specific objects in the image; an advanced object detection model that recognizes multiple objects (e.g., a soccer field, a striker, a defender, or a soccer ball) present in one image (where the model uses XY coordinates to generate bounding boxes and identify everything therein); a facial recognition function, which not only recognizes human faces in the image but also identifies individuals; a boundary detection function, which identifies outer boundaries of objects or a scene to more accurately understand the content of the image, a pattern detection function, which recognizes repeated shapes, colors, or other visual indicators in the images; and a feature matching function, which compares similarities of images and classifies the images accordingly.

The image analysis function may be performed by the vehicle service providing server 200, not by the processor 110 of the vehicular electronic device 100.

The power management module 111 manages power for the processor 110 and/or the communication unit 130. The battery 112 provides power to the power management module 111.

The display unit 113 outputs results processed by the processor 110.

The display unit 113 may output content, data, or signals. In various embodiments, the display unit 113 may display an image signal processed by the processor 110. For example, the display unit 113 may display a capture or still image. In another example, the display unit 113 may display a video or a camera preview image. In yet another example, the display unit 113 may display a graphical user interface (GUI) to interact with the vehicular electronic device 100. The display unit 113 may include at least one of a liquid crystal display (LCD), a thin film transistor-liquid crystal display, an organic light-emitting diode (OLED), a flexible display, and a 3D display. The display unit 113 may be configured as an integrated touch screen by being coupled with a sensor capable of receiving a touch input.

The user input unit 114 receives an input to be used by the processor 110. The user input unit 114 may be displayed on the display unit 113. The user input unit 114 may sense a touch or hovering input of a finger or a pen. The user input unit 114 may detect an input caused by a rotatable structure or a physical button. The user input unit 114 may include sensors for detecting various types of inputs. The inputs received by the user input unit 114 may have various types. For example, the input received by the user input unit 114 may include touch and release, drag and drop, long touch, force touch, and physical depression. The input unit 430 may provide the received input and data related to the received input to the control unit 450. In various embodiments, the user input unit 114 may include a microphone or a transducer capable of receiving a user's voice command. In various embodiments, the user input unit 114 may include an image sensor or a camera capable of capturing a user's motion.

The sensor unit 115 includes one or more sensors. The sensor unit 115 has the function of detecting an impact applied to the vehicle or detecting a case where the amount of acceleration change exceeds a certain level. In some embodiments, the sensor unit 115 may be image sensors such as high dynamic range cameras. In some embodiments, the sensor unit 115 includes non-visual sensors. In some embodiments, the sensor unit 115 may include a radar sensor, a light detection and ranging (LiDAR) sensor, and/or an ultrasonic sensor in addition to an image sensor. In some embodiments, the sensor unit 115 may include an acceleration sensor or a geomagnetic field sensor to detect impact or acceleration.

In various embodiments, the sensor unit 115 may be attached at different positions and/or attached to face one or more different directions. For example, the sensor unit 115 may be attached to the front, sides, rear, and/or roof of a vehicle to face the forward-facing, rear-facing, and side-facing directions.

The camera unit 116 may capture an image in at least one of the situations, including parking, stopping, and driving a vehicle. Here, the captured image may include a parking lot image that is a captured image of the parking lot. The parking lot image may include images captured from when a vehicle enters the parking lot to when the vehicle leaves the parking lot. In other words, the parking lot image may include images taken from when the vehicle enters the parking lot until when the vehicle is parked (e.g., the time the vehicle is turned off to park), the images taken while the vehicle is parked, and the images taken from when the vehicle gets out of the parked state (e.g., the vehicle is started on to leave the parking lot) to when the vehicle leaves the parking lot. The captured image may include at least one image of the front, rear, side, and interior of the vehicle. Also, the camera unit 116 may include an infrared camera capable of monitoring the driver's face or pupils.

The camera unit 116 may include a lens unit and an imaging device. The lens unit may perform the function of condensing an optical signal, and an optical signal transmitted through the lens unit reaches an imaging area of the imaging device to form an optical image. Here, the imaging device may use a Charge Coupled Device (CCD), a Complementary Metal Oxide Semiconductor Image Sensor (CIS), or a high-speed image sensor, which converts an optical signal into an electrical signal. Also, the camera unit 116 may further include all or part of a lens unit driver, an aperture, an aperture driving unit, an imaging device controller, and an image processor.

The operation mode of the vehicular electronic device 100 may include a continuous recording mode, an event recording mode, a manual recording mode, and a parking recording mode.

The continuous recording mode is executed when the vehicle is started up and remains operational while the vehicle continues to drive. In the continuous recording mode, the vehicle image capture device 100 may perform recording in predetermined time units (e.g., 1 to 5 minutes). In the present disclosure, the continuous recording mode and the continuous mode may be used in the same meaning.

The parking recording mode may refer to a mode operating in a parked state when the vehicle's engine is turned off, or the battery supply for vehicle driving is stopped. In the parking recording mode, the vehicular electronic device 100 may operate in the continuous parking recording mode in which continuous recording is performed while the vehicle is parked. Also, in the parking recording mode, the vehicular electronic device 100 may operate in a parking event recording mode in which recording is performed when an impact event is detected during parking. In this case, recording may be performed during a predetermined period ranging from a predetermined time before the occurrence of the event to a predetermined time after the occurrence of the event (e.g., recording from 10 seconds before to 10 seconds after the occurrence of the event). In the present disclosure, the parking recording mode and the parking mode may be used in the same meaning.

The event recording mode may refer to the mode operating at the occurrence of various events while the vehicle is driving.

The manual recording mode may refer to a mode in which a user manually operates recording. In the manual recording mode, the vehicular electronic device 100 may perform recording (e.g., recording of images 10 seconds before to 10 seconds after an event) from a predetermined time before the occurrence of the user's manual recording request to the time after the predetermined time.

The memory 120 is operatively coupled to the processor 110 and stores a variety of information for operating the processor 110. The memory 120 may include a read-only memory (ROM), a random-access memory (RAM), a flash memory, a memory card, a storage medium, and/or other equivalent storage devices. When the embodiment is implemented in software, the techniques explained in the present disclosure may be implemented with a module (i.e., procedure, function, etc.) for performing the functions explained in the present disclosure. The module may be stored in the memory 120 and may be performed by the processor 110. The memory 120 may be implemented inside the processor 110. Alternatively, the memory 120 may be implemented outside the processor 110 and may be coupled to the processor 110 in a communicable manner by using various well-known means.

The memory 120 may be integrated within the vehicular electronic device 100, installed in a detachable form through a port provided by the vehicular electronic device 100, or located externally to the vehicular electronic device 100. When the memory 120 is integrated within the vehicular electronic device 100, the memory 120 may take the form of a hard disk drive or a flash memory. When the memory 120 is installed in a detachable form in the vehicular electronic device 100, the memory 120 may take the form of an SD card, a Micro SD card, or a USB memory. When the memory 120 is located externally to the vehicular electronic device 100, the memory 120 may exist in a storage space of another device or a database server through the communication unit 130.

The communication unit 130 is coupled operatively to the processor 110 and transmits and/or receives a radio signal. The communication unit 130 includes a transmitter and a receiver. The communication unit 130 may include a baseband circuit for processing a radio frequency signal. The communication unit 130 controls one or more antennas 131 to transmit and/or receive a radio signal. The communication unit 130 enables the vehicular electronic device 100 to communicate with other devices. Here, the communication unit 130 may be provided as a combination of at least one of various well-known communication modules, such as a cellular mobile communication module, a short-distance wireless communication module such as a wireless local area network (LAN) method, or a communication module using the low-power wide-area (LPWA) technique. Also, the communication unit 130 may perform a location-tracking function, such as the Global Positioning System (GPS) tracker.

The speaker 140 outputs a sound-related result processed by the processor 110. For example, the speaker 140 may output audio data indicating that a parking event has occurred. The microphone 141 receives sound-related input to be used by processor 110. The received sound, which is a sound caused by an external impact or a person's voice related to a situation inside/outside the vehicle, may help to recognize the situation at that time along with images captured by the camera unit 116. The sound received through the microphone 141 may be stored in the memory 120.

Figure 3:
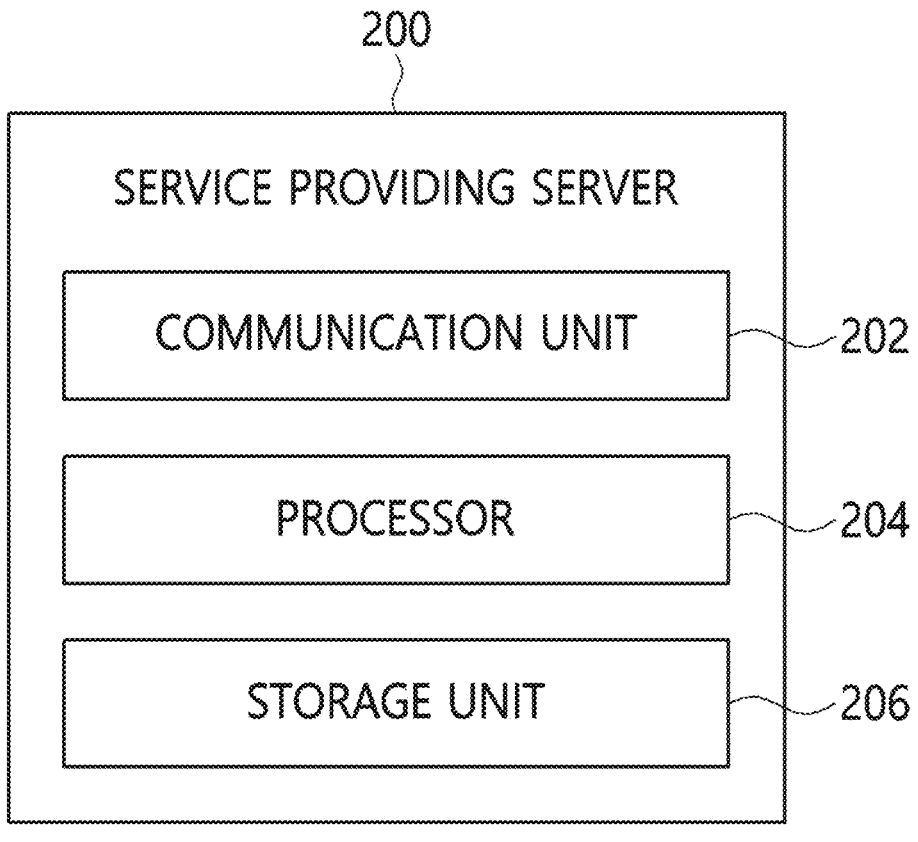
FIG. 3 is a block diagram illustrating a vehicle service providing server according to one embodiment.

FIG. 3 is a block diagram illustrating a vehicle service providing server according to one embodiment.

Referring to FIG. 3, the vehicle service providing server 200 includes a communication unit 202, a processor 204, and a storage unit 206. The communication unit 202 of the vehicle service providing server 200 transmits and receives data to and from the vehicular electronic device 100 and/or the user terminal 300 through a wired/wireless communication network.

Figure 4:
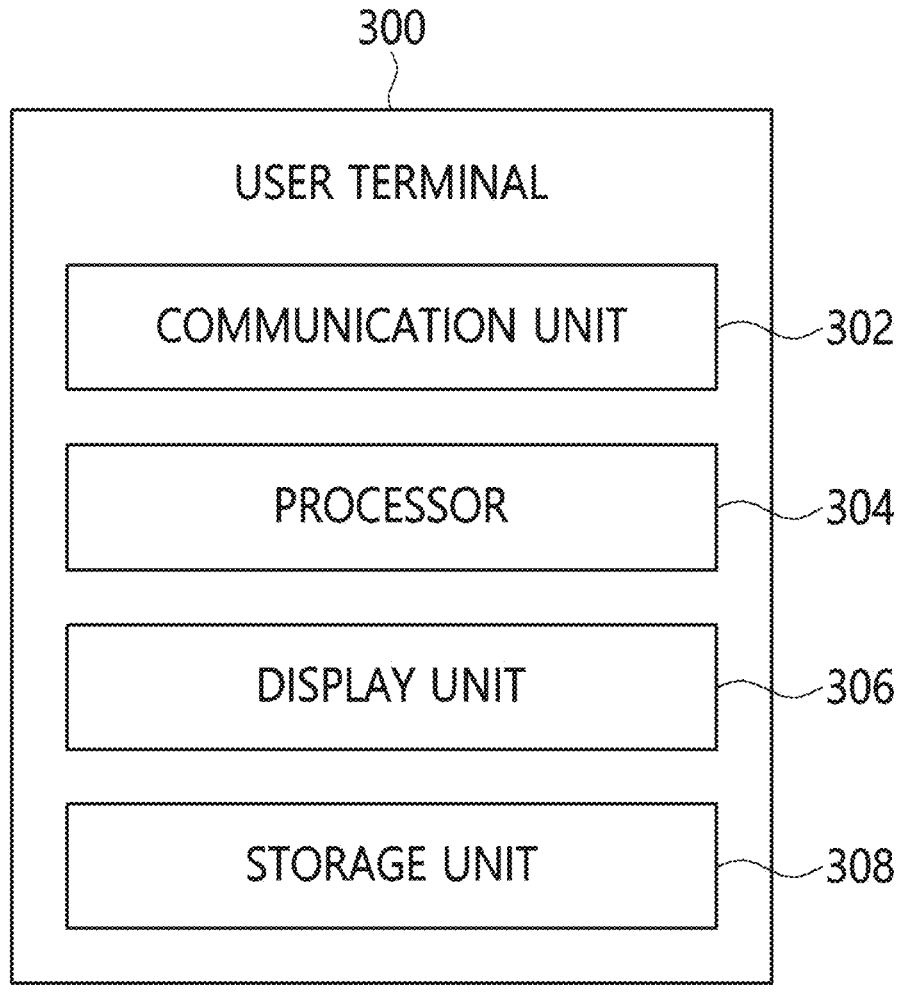
FIG. 4 is a block diagram of a user terminal according to one embodiment.

FIG. 4 is a block diagram of a user terminal according to one embodiment.

Referring to FIG. 4, the user terminal 300 includes a communication unit 302, a processor 304, a display unit 306, and a storage unit 308. The communication unit 302 transmits and receives data to and from the vehicular electronic device 100 and/or the vehicle service providing server 200 through a wired/wireless communication network. The processor 304 controls the overall function of the user terminal 300 and transmits a command input by the user to the vehicle service system 1000 through the communication unit 302 according to an embodiment of the present disclosure. When a control message related to a vehicle service is received from the vehicle service providing server 200, the processor 304 controls the display unit 306 to display the control message to the user.

Figure 5:
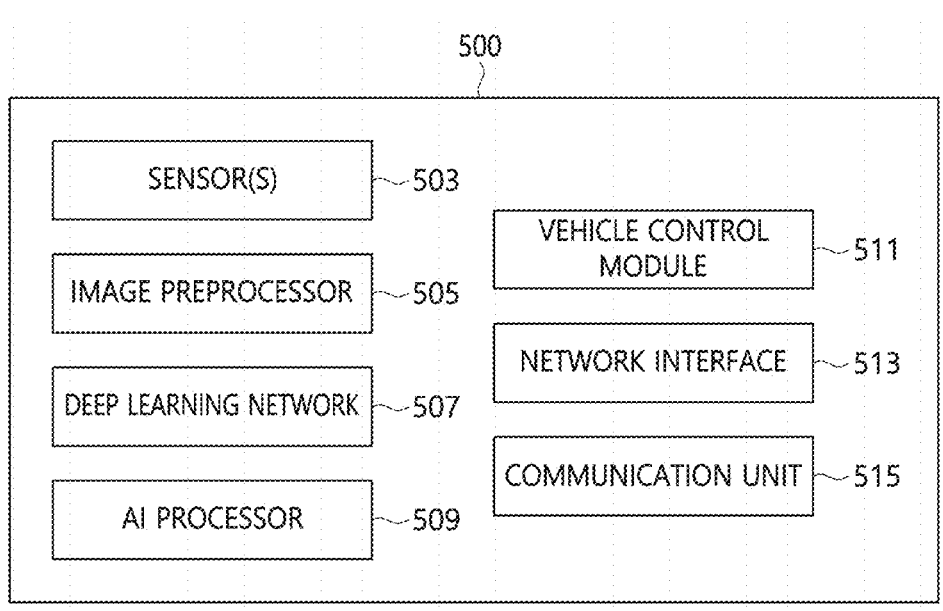
FIG. 5 is a block diagram illustrating an autonomous driving system of a vehicle according to one embodiment.

FIG. 5 is a block diagram illustrating an autonomous driving system 500 of a vehicle.

The autonomous driving system 500 of a vehicle according to FIG. 5 may be a deep learning network including sensors 503, an image preprocessor 505, a deep learning network 507, an artificial intelligence (AI) processor 509, a vehicle control module 511, a network interface 513, and a communication unit 515. In various embodiments, each constituting element may be connected through various interfaces. For example, sensor data sensed and output by the sensors 503 may be fed to the image preprocessor 505. The sensor data processed by the image preprocessor 505 may be fed to the deep learning network 507 that runs on the AI processor 509. The output of the deep learning network 507 run by the AI processor 509 may be fed to the vehicle control module 511. Intermediate results of the deep learning network 507 running on the AI processor 509 may be fed to the AI processor 509. In various embodiments, the network interface 513 transmits autonomous driving path information and/or autonomous driving control commands for the autonomous driving of the vehicle to internal block components by communicating with an electronic device in the vehicle. In one embodiment, the network interface 531 may be used to transmit sensor data obtained through sensor(s) 503 to an external server. In some embodiments, the autonomous driving control system 500 may include additional or fewer constituting elements, as deemed appropriate. For example, in some embodiments, the image preprocessor 505 may be an optional component. For another example, a post-processing component (not shown) may be included within the autonomous driving control system 500 to perform post-processing on the output of the deep learning network 507 before the output is provided to the vehicle control module 511.

In some embodiments, the sensors 503 may include one or more sensors. In various embodiments, the sensors 503 may be attached to different locations on the vehicle. The sensors 503 may face one or more different directions. For example, the sensors 503 may be attached to the front, sides, rear, and/or roof of a vehicle to face the forward-facing, rear-facing, and side-facing directions. In some embodiments, the sensors 503 may be image sensors such as high dynamic range cameras. In some embodiments, the sensors 503 include non-visual sensors. In some embodiments, the sensors 503 include a radar sensor, a light detection and ranging (LiDAR) sensor, and/or ultrasonic sensors in addition to the image sensor. In some embodiments, the sensors 503 are not mounted on a vehicle with the vehicle control module 511. For example, the sensors 503 may be included as part of a deep learning system for capturing sensor data, attached to the environment or road, and/or mounted to surrounding vehicles.

In some embodiments, the image preprocessor 505 may be used to preprocess sensor data of the sensors 503. For example, the image preprocessor 505 may be used to pre-process sensor data, split sensor data into one or more components, and/or postprocess one or more components. In some embodiments, the image preprocessor 505 may be a graphics processing unit (GPU), a central processing unit (CPU), an image signal processor, or a specialized image processor. In various embodiments, image preprocessor 505 may be a tone-mapper processor for processing high dynamic range data. In some embodiments, image preprocessor 505 may be a constituting element of AI processor 509.

In some embodiments, the deep learning network 507 may be a deep learning network for implementing control commands for controlling an autonomous vehicle. For example, the deep learning network 507 may be an artificial neural network such as a convolutional neural network (CNN) trained using sensor data, and the output of the deep learning network 507 is provided to the vehicle control module 511.

In some embodiments, the artificial intelligence (AI) processor 509 may be a hardware processor for running the deep learning network 507. In some embodiments, the AI processor 509 is a specialized AI processor for performing inference through a convolutional neural network (CNN) on sensor data. In some embodiments, the AI processor 509 may be optimized for bit depth of sensor data. In some embodiments, AI processor 509 may be optimized for deep learning computations, such as those of a neural network including convolution, inner product, vector and/or matrix operations. In some embodiments, the AI processor 509 may be implemented through a plurality of graphics processing units (GPUs) capable of effectively performing parallel processing.

In various embodiments, the AI processor 509 may be coupled through an input/output interface to a memory configured to provide the AI processor with instructions to perform deep learning analysis on the sensor data received from the sensor(s) 503 while the AI processor 509 is running and to determine machine learning results used to make the vehicle operate with at least a proportional autonomy. In some embodiments, the vehicle control module 511 may be used to process commands for vehicle control output from the artificial intelligence (AI) processor 509 and translate the output of the AI processor 509 into commands for controlling each vehicle module to control various vehicle modules. In some embodiments, the vehicle control module 511 is used to control a vehicle for autonomous driving. In some embodiments, the vehicle control module 511 may adjust the steering and/or speed of the vehicle. For example, the vehicle control module 511 may be used to control the driving of the vehicle, such as deceleration, acceleration, steering, lane change, and lane-keeping function. In some embodiments, the vehicle control module 511 may generate control signals to control vehicle lighting, such as brake lights, turn signals, and headlights. In some embodiments, the vehicle control module 511 may be used to control vehicle audio-related systems, such as the vehicle's sound system, audio warnings, microphone system, and horn system.

In some embodiments, the vehicle control module 511 may be used to control notification systems that include warning systems to alert passengers and/or drivers of driving events, such as approaching an intended destination or potential collision. In some embodiments, the vehicle control module 511 may be used to calibrate sensors, such as the sensors 503 of the vehicle. For example, the vehicle control module 511 may modify the orientation of the sensors 503, change the output resolution and/or format type of the sensors 503, increase or decrease the capture rate, adjust the dynamic range, and adjust the focus of the camera. Also, the vehicle control module 511 may individually or collectively turn on or off the operation of the sensors.

In some embodiments, the vehicle control module 511 may be used to change the parameters of the image preprocessor 505, such as modifying the frequency range of filters, adjusting edge detection parameters for feature and/or object detection, and adjusting channels and bit depth. In various embodiments, the vehicle control module 511 may be used to control the autonomous driving and/or driver assistance functions of the vehicle.

In some embodiments, the network interface 513 may serve as an internal interface between block components of the autonomous driving control system 500 and the communication unit 515. Specifically, the network interface 513 may be a communication interface for receiving and/or sending data that includes voice data. In various embodiments, the network interface 513 may be connected to external servers to connect voice calls through the communication unit 515, receive and/or send text messages, transmit sensor data, update the software of the vehicle into the autonomous driving system, or update the software of the autonomous driving system of the vehicle.

In various embodiments, the communication unit 515 may include various cellular or WiFi-type wireless interfaces. For example, the network interface 513 may be used to receive updates on operating parameters and/or instructions for the sensors 503, image preprocessor 505, deep learning network 507, AI processor 509, and vehicle control module 511 from an external server connected through the communication unit 515. For example, a machine learning model of the deep learning network 507 may be updated using the communication unit 515. According to another example, the communication unit 515 may be used to update the operating parameters of the image preprocessor 505 such as image processing parameters and/or the firmware of the sensors 503.

In another embodiment, the communication unit 515 may be used to activate communication for emergency services and emergency contact in an accident or near-accident event. For example, in the event of a collision, the communication unit 515 may be used to call emergency services for assistance and may be used to inform emergency services of the collision details and the vehicle location. In various embodiments, the communication unit 515 may update or obtain an expected arrival time and/or the location of a destination.

According to one embodiment, the autonomous driving system 500 shown in FIG. 5 may be configured as a vehicular electronic device. According to one embodiment, when the user triggers an autonomous driving release event during autonomous driving of the vehicle, the AI processor 509 of the autonomous driving system 500 may train the autonomous driving software of the vehicle by controlling the information related to the autonomous driving release event to be input as the training set data of a deep learning network.

Figure 6:
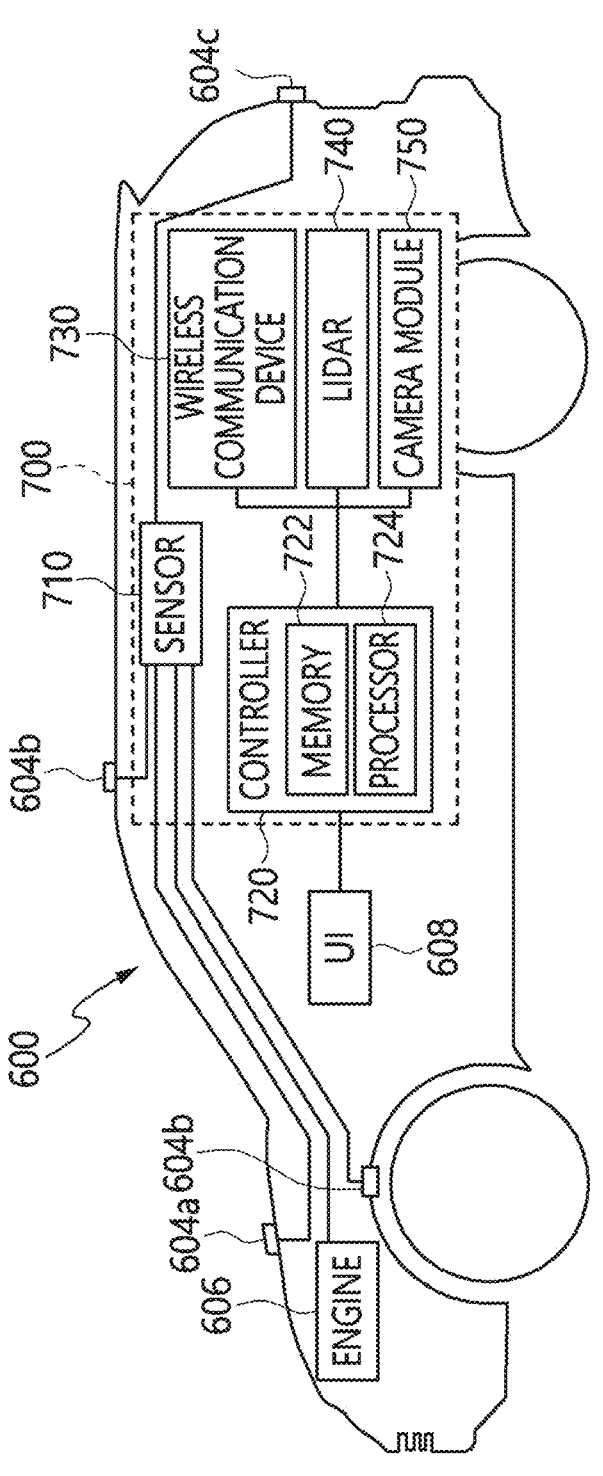
FIGS. 6 and 7 are block diagrams illustrating an autonomous driving moving body according to one embodiment.
Figure 7:
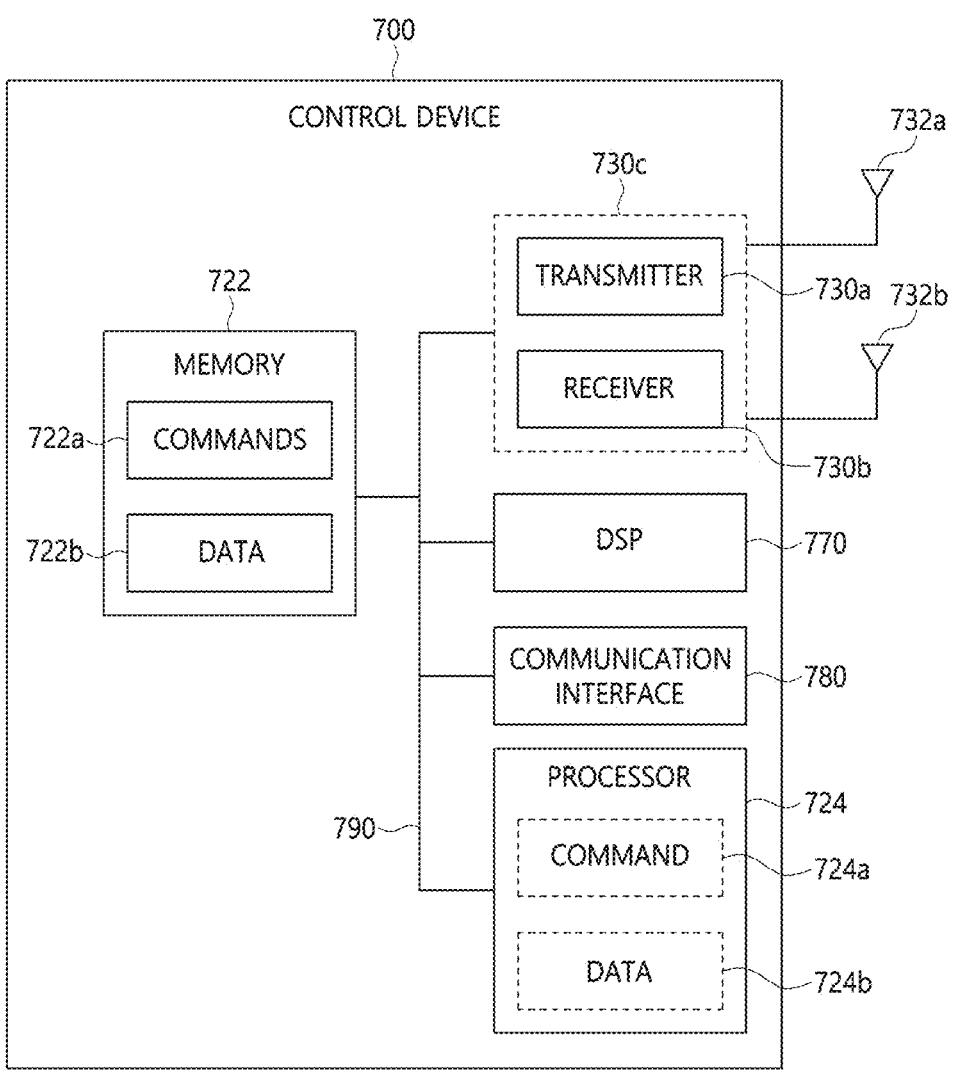

FIGS. 6 and 7 are one example of a block diagram illustrating an autonomous driving moving body according to one embodiment. Referring to FIG. 6, the autonomous driving moving body 600 according to the present embodiment may include a control device 700, sensing modules 604a, 604b, 604c, 604d, an engine 606, and a user interface 608.

The autonomous driving moving body 600 may have an autonomous driving mode or a manual mode. For example, the manual mode may be switched to the autonomous driving mode, or the autonomous driving mode may be switched to the manual mode according to the user input received through the user interface 608.

When the autonomous driving moving body 600 is operated in the autonomous driving mode, the autonomous driving moving body 600 may be operated under the control of the control device 700.

In the present embodiment, the control device 700 may include a controller 720 that includes a memory 722 and a processor 724, a sensor 710, a communication device 730, and an object detection device 740.

Here, the object detection device 740 may perform all or part of the functions of the distance measuring device (e.g., the electronic device 71).

In other words, in the present embodiment, the object detection device 740 is a device for detecting an object located outside the moving body 600, and the object detection device 740 may detect an object located outside the moving body 600 and generate object information according to the detection result.

The object information may include information on the presence or absence of an object, location information of the object, distance information between the moving body and the object, and relative speed information between the moving body and the object.

The objects may include various objects located outside the moving body 600, such as lanes, other vehicles, pedestrians, traffic signals, lights, roads, structures, speed bumps, terrain objects, and animals. Here, the traffic signal may include a traffic light, a traffic sign, and a pattern or text drawn on a road surface. Also, the light may be light generated from a lamp installed in another vehicle, light generated from a street lamp, or sunlight.

Also, the structures may be an object located near the road and fixed to the ground. For example, the structures may include street lights, street trees, buildings, telephone poles, traffic lights, and bridges. The terrain objects may include a mountain, a hill, and the like.

The object detection device 740 may include a camera module. The controller 720 may extract object information from an external image captured by the camera module and process the extracted information.

Also, the object detection device 740 may further include imaging devices for recognizing an external environment. In addition to the LiDAR sensors, radar sensors, GPS devices, odometry and other computer vision devices, ultrasonic sensors, and infrared sensors may be used, and these devices may be selected as needed or operated simultaneously to enable more precise sensing.

Meanwhile, the distance measuring device according to one embodiment of the present disclosure may calculate the distance between the autonomous driving moving body 600 and an object and control the operation of the moving body based on the calculated distance in conjunction with the control device 700 of the autonomous driving moving body 600.

As an example, suppose a collision may occur depending on the distance between the autonomous driving moving body 600 and an object. In that case, the autonomous driving moving body 600 may control the brake to slow down or stop. As another example, if the object is a moving object, the autonomous driving moving body 600 may control the driving speed of the autonomous driving moving body 600 to keep a distance larger than a predetermined threshold from the object.

The distance measuring device according to one embodiment of the present disclosure may be configured as one module within the control device 700 of the autonomous driving moving body 600. In other words, the memory 722 and the processor 724 of the control device 700 may implement a collision avoidance method according to the present disclosure in software.

Also, the sensor 710 may obtain various types of sensing information from the internal/external environment of the moving body by being connected to the sensing modules 604a, 604b, 604c, and 604d. Here, the sensor 710 may include a posture sensor (e.g., a yaw sensor, a roll sensor, or a pitch sensor), a collision sensor, a wheel sensor, a speed sensor, an inclination sensor, a weight sensor, a heading sensor, a gyro sensor, a position module, a sensor measuring the forward/backward movement of the moving body, a battery sensor, a fuel sensor, a tire sensor, a steering sensor measuring the rotation of the steering wheel, a sensor measuring the internal temperature of the moving body, and a sensor measuring the internal humidity of the moving body, an ultrasonic sensor, an illumination sensor, an accelerator pedal position sensor, and a brake pedal position sensor.

Accordingly, the sensor 710 may obtain sensing signals related to moving body attitude information, moving body collision information, moving body direction information, moving body position information (GPS information), moving body orientation information, moving body speed information, moving body acceleration information, moving body tilt information, moving body forward/backward movement information, battery information, fuel information, tire information, moving body lamp information, moving body internal temperature information, moving body internal humidity information, steering wheel rotation angle, external illuminance of the moving body, pressure applied to the accelerator pedal, and pressure applied to the brake pedal.

Also, the sensor 710 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crank angle sensor (CAS).

As described above, the sensor 710 may generate moving object state information based on the sensing data.

The wireless communication device 730 is configured to implement wireless communication between autonomous driving moving bodies 600. For example, the wireless communication device 730 enables the autonomous driving moving body 600 to communicate with a user's mobile phone, another wireless communication device 730, another moving body, a central device (traffic control device), or a server. The wireless communication device 730 may transmit and receive wireless signals according to a wireless communication protocol. The wireless communication protocol may be Wi-Fi, Bluetooth, Long-Term Evolution (LTE), Code Division Multiple Access (CDMA), Wideband Code Division Multiple Access (WCDMA), or Global Systems for Mobile Communications (GSM); however, the communication protocol is not limited to the specific examples above.

Also, the autonomous driving moving body 600 according to the present embodiment may implement communication between mobile bodies through the wireless communication device 730. In other words, the wireless communication device 730 may communicate with other moving bodies on the road through vehicle-to-vehicle communication. The autonomous driving moving body 600 may transmit and receive information such as a driving warning and traffic information through vehicle-to-vehicle communication and may also request information from another moving body or receive a request from another moving body. For example, the wireless communication device 730 may perform V2V communication using a dedicated short-range communication (DSRC) device or a Cellular-V2V (C—V2V) device. In addition to the V2V communication, communication between a vehicle and other objects (e.g., electronic devices carried by pedestrians) (Vehicle to Everything (V2X) communication) may also be implemented through the wireless communication device 730.

In the present embodiment, the controller 720 is a unit that controls the overall operation of each unit within the moving body 600, which may be configured by the manufacturer of the moving body at the time of manufacturing or additionally configured to perform the function of autonomous driving after manufacturing. Alternatively, the controller may include a configuration for the continuing execution of additional functions through an upgrade of the controller 720 configured at the time of manufacturing. The controller 720 may be referred to as an Electronic Control Unit (ECU).

The controller 720 may collect various data from the connected sensor 710, the object detection device 740, the communication device 730, and so on and transmit a control signal to the sensor 710, the engine 606, the user interface 608, the communication device 730, and the object detection device 740 including other configurations within the moving body. Also, although not shown in the figure, the control signal may be transmitted to an accelerator, a braking system, a steering device, or a navigation device related to the driving of the moving body.

In the present embodiment, the controller 720 may control the engine 606; for example, the controller 720 may detect the speed limit of the road on which the autonomous driving moving body 600 is driving and control the engine to prevent the driving speed from exceeding the speed limit or control the engine 606 to accelerate the driving speed of the autonomous driving moving body 600 within a range not exceeding the speed limit.

Also, if the autonomous driving moving body 600 is approaching or departing from the lane while the autonomous driving moving body 600 is driving, the controller 720 may determine whether the approaching or departing from the lane is due to a normal driving situation or other unexpected driving situations and control the engine 606 to control the driving of the moving body according to the determination result. Specifically, the autonomous driving moving body 600 may detect lanes formed on both sides of the road in which the moving body is driving. In this case, the controller 720 may determine whether the autonomous driving moving body 600 is approaching or leaving the lane; if it is determined that the autonomous driving moving body 600 is approaching or departing from the lane, the controller 720 may determine whether the driving is due to a normal driving situation or other driving situations. Here, as an example of a normal driving situation, the moving body may need to change lanes. Similarly, as an example of other driving situations, the moving body may not need a lane change. If the controller 720 determines that the autonomous driving moving body 600 is approaching or departing from the lane in a situation where a lane change is not required for the moving body, the controller 720 may control the driving of the autonomous driving moving body 600 so that the autonomous driving moving body 600 does not leave the lane and keeps normal driving.

When encountering another moving body or an obstacle in front of the moving body, the controller 720 may control the engine 606 or the braking system to decelerate the autonomous driving moving body and control the trajectory, driving path, and steering angle in addition to speed. Alternatively, the controller 720 may control the driving of the moving body by generating necessary control signals according to the recognition information of other external environments, such as driving lanes and driving signals of the moving body.

In addition to generating a control signal for the moving body, the controller 720 may also control the driving of the moving body by communicating with surrounding moving bodies or a central server and transmitting commands to control the peripheral devices through the received information.

Also, when the position of the camera module 750 is changed, or the angle of view is changed, it may be difficult for the controller 720 to accurately recognize a moving object or a lane according to the present embodiment; to address the issue above, the controller 750 may generate a control signal, which controls the camera module 750 to perform calibration. Therefore, since the controller 720 according to the present embodiment generates a control signal for the calibration of the camera module 750, the normal mounting position, orientation, and angle of view of the camera module 750 may be kept continuously even if the mounting position of the camera module 750 is changed due to vibration or shock generated by the motion of the autonomous driving moving body 600. The controller 720 may generate a control signal to perform calibration of the camera module 720 when the initial mounting position, orientation, and angle of view information of the camera module 720 stored in advance deviate from the initial mounting position, orientation, and angle of view information of the camera module 720 measured while the autonomous driving moving body 600 is driving by more than a threshold value.

In the present embodiment, the controller 720 may include the memory 722 and the processor 724. The processor 724 may execute the software stored in the memory 722 according to the control signal of the controller 720. Specifically, the controller 720 may store data and commands for performing a lane detection method according to the present disclosure in the memory 722, and the commands may be executed by the processor 724 to implement one or more methods of the present disclosure.

At this time, the memory 722 may be implemented by a non-volatile recording medium executable by the processor 724. The memory 722 may store software and data through an appropriate internal or external device. The memory 722 may be configured to include a random-access memory (RAM), a read only memory (ROM), a hard disk, and a memory 722 device coupled with a dongle.

The memory 722 may store at least an operating system (OS), a user application, and executable commands. The memory 722 may also store application data and array data structures.

The processor 724 may be a microprocessor or an appropriate electronic processor, which may be a controller, a microcontroller, or a state machine.

The processor 724 may be implemented as a combination of computing devices, and the computing device may be a digital signal processor, a microprocessor, or an appropriate combination thereof.

Meanwhile, the autonomous driving moving body 600 may further include a user interface 608 for receiving a user's input to the control device 700 described above. The user interface 608 may allow the user to enter information through an appropriate interaction. For example, the user interface 608 may be implemented as a touch screen, a keypad, or a set of operation buttons. The user interface 608 may transmit an input or a command to the controller 720, and the controller 720 may perform a control operation of the moving object in response to the input or command.

Also, the user interface 608 may allow a device external to the autonomous driving moving body 600 to communicate with the autonomous driving moving body 600 through the wireless communication device 730. For example, the user interface 608 may be compatible with a mobile phone, a tablet, or other computing devices.

Furthermore, although the present embodiment assumes that the autonomous driving moving body 600 is configured to include the engine 606, it is also possible to include other types of propulsion systems. For example, the moving body may be operated by electric energy, hydrogen energy, or a hybrid system combining them. Therefore, the controller 720 may include a propulsion mechanism according to the propulsion system of the autonomous driving moving body 600 and provide a control signal according to the propulsion mechanism to the components of each propulsion mechanism.

In what follows, a specific structure of the control device 700 according to an embodiment of the present disclosure will be described in more detail with reference to FIG. 7.

The control device 700 includes a processor 724. The processor 724 may be a general-purpose single or multi-chip microprocessor, a dedicated microprocessor, a microcontroller, or a programmable gate array. The processor may be referred to as a central processing unit (CPU). Also, the processor 724 according to the present disclosure may be implemented by a combination of a plurality of processors. The control device 700 also includes a memory 722. The memory 722 may be an arbitrary electronic component capable of storing electronic information. The memory 722 may also include a combination of memories 722 in addition to a single memory.

The memory 722 may store data and commands 722a for performing a distance measuring method by a distance measuring device according to the present disclosure. When the processor 724 performs the commands 722a, the commands 722a and the whole or part of the data 722b needed to perform the commands may be loaded into the processor 724.

The control device 700 may include a transmitter 730a, a receiver 730b, or a transceiver 730c for allowing transmission and reception of signals. One or more antennas 732a, 732b may be electrically connected to the transmitter 730a, receiver 730b, or each transceiver 730c and may additionally include antennas.

The control device 700 may include a digital signal processor (DSP) 770. Through the DSP 770, the moving body may quickly process digital signals.

The control device 700 may include a communication interface 780. The communication interface 780 may include one or more ports and/or communication modules for connecting other devices to the control device 700. The communication interface 780 may allow a user and the control device 700 to interact with each other.

Various components of the control device 700 may be connected together by one or more buses 790, and the buses 790 may include a power bus, a control signal bus, a status signal bus, a data bus, and the like. Under the control of the processor 724, components may transfer information to each other through the bus 790 and perform target functions.

Figure 8:
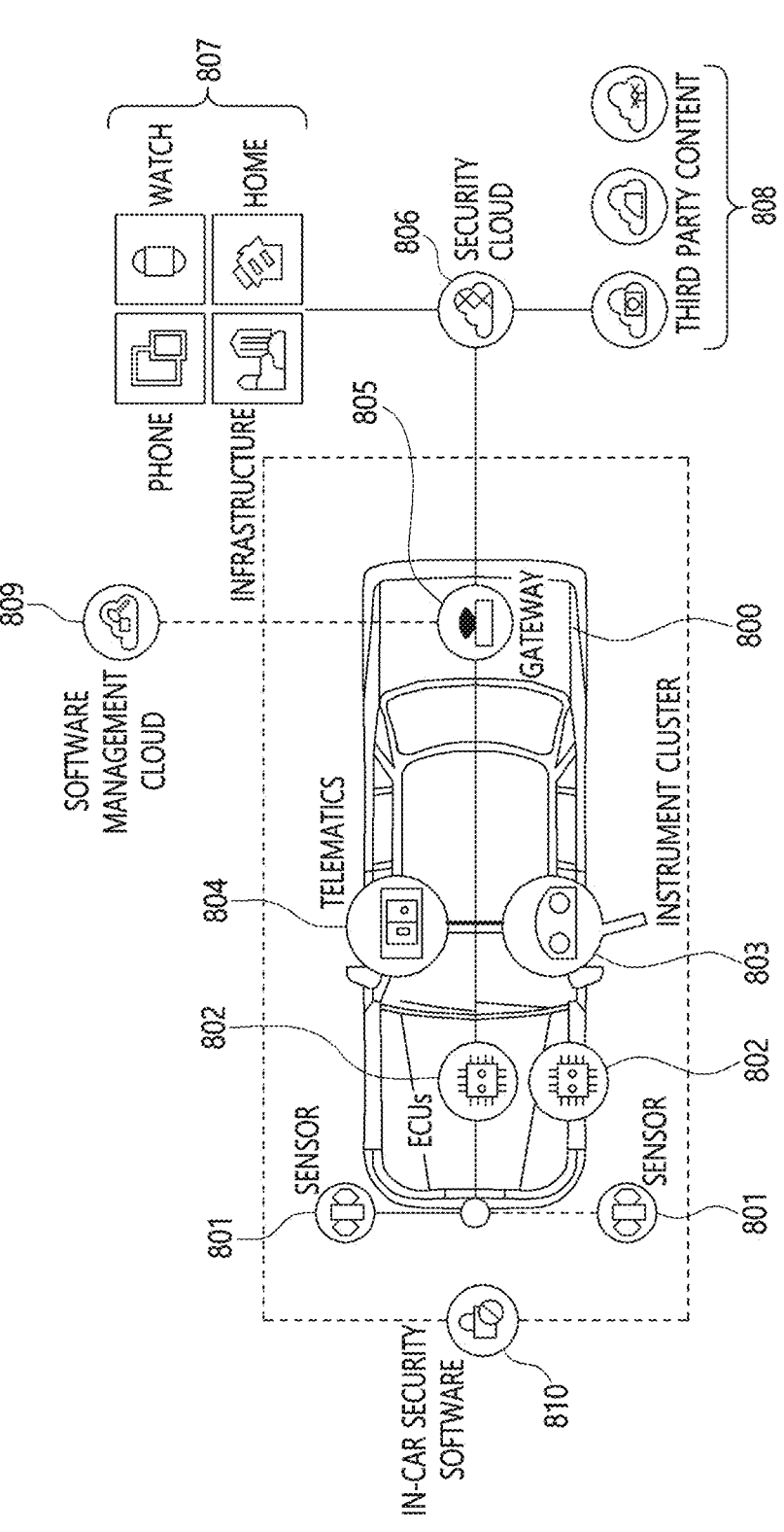
FIG. 8 illustrates an autonomous driving system of a vehicle according to one embodiment.

Meanwhile, in various embodiments, the control device 700 may be associated with a gateway for communication with a security cloud. For example, referring to FIG. 8, the control device 700 may be related to a gateway 805 for providing information obtained from at least one of the components 801 to 804 of the vehicle 800 to the security cloud 806. For example, the gateway 805 may be included in the control device 700. In another example, the gateway 805 may be configured as a separate device within the vehicle 800 distinguished from the control device 700. The gateway 805 communicatively connects the software management cloud 809 having different networks, the security cloud 806, and the network within the vehicle 800 secured by the in-vehicle security software 810.

For example, the constituting element 801 may be a sensor. For example, the sensor may be used to obtain information on at least one of the state of the vehicle 800 and the state of the surroundings of the vehicle 800. For example, the constituting element 801 may include the sensor.

For example, the constituting element 802 may be electronic control units (ECUs). For example, the ECUs may be used for engine control, transmission control, airbag control, and management of tire air pressure management.

For example, the constituting element 803 may be an instrument cluster. For example, the instrument cluster may refer to a panel located in front of a driver's seat in the dashboard. For example, the instrument cluster may be configured to show information necessary for driving to the driver (or passengers). For example, the instrument cluster may be used to display at least one of the visual elements for indicating revolutions per minute or rotate per minute (RPM) of the engine, visual elements for indicating the speed of the vehicle 800, visual elements for indicating the remaining fuel amount, visual elements for indicating the state of the gear, or visual elements for indicating information obtained through the constituting element 801.

For example, the constituting element 804 may be a telematics device. For example, the telematics device may refer to a device that provides various mobile communication services such as location information and safe driving within the vehicle 800 by combining wireless communication technology and global positioning system (GPS) technology. For example, the telematics device may be used to connect the vehicle 800 with the driver, the cloud (e.g., the security cloud 806), and/or the surrounding environment.

For example, the telematics device may be configured to support high bandwidth and low latency to implement the 5G NR standard technology (e.g., V2X technology of 5G NR). For example, the telematics device may be configured to support autonomous driving of the vehicle 800.

For example, the gateway 805 may be used to connect a software management cloud 809 and the security cloud 806, which are a network inside the vehicle 800 and a network outside the vehicle. For example, the software management cloud 809 may be used to update or manage at least one software necessary for driving and managing the vehicle 800. For example, the software management cloud 809 may be linked with in-car security software 810 installed within the vehicle. For example, the in-car security software 810 may be used to provide the security function within the vehicle 800. For example, the in-car security software 810 may encrypt data transmitted and received through the in-car network using an encryption key obtained from an external authorized server to encrypt the in-vehicle network. In various embodiments, the encryption key used by the in-car security software 810 may be generated in response to the vehicle identification information (license plate or vehicle identification number (VIN)) or information uniquely assigned to each user (e.g., user identification information).

In various embodiments, the gateway 805 may transmit data encrypted by the in-car security software 810 based on the encryption key to the software management cloud 809 and/or the security cloud 806. The software management cloud 809 and/or the security cloud 806 may identify from which vehicle or which user the data has been received by decrypting encrypted data using a decryption key capable of decrypting the data encrypted by the encryption key of the in-vehicle security software 810. For example, since the decryption key is a unique key corresponding to the encryption key, the software management cloud 809 and/or the security cloud 806 may identify the transmitter of the data (e.g., the vehicle or the user) based on the data decrypted through the decryption key.

For example, the gateway 805 may be configured to support in-car security software 810 and may be associated with the control device 700. For example, the gateway 805 may be associated with the control device 700 to support a connection between the control device 700 and a client device 807 connected to the security cloud 806. In another example, the gateway 805 may be associated with the control device 700 to support a connection between the control device 700 and the third-party cloud 808 connected to the security cloud 806. However, the present disclosure is not limited to the specific description above.

In various embodiments, the gateway 805 may be used to connect the vehicle 800 with a software management cloud 809 for managing the operating software of the vehicle 800. For example, the software management cloud 809 may monitor whether an update of the operating software of the vehicle 800 is required and provide data for updating the operating software of the vehicle 800 through the gateway 805 based on the monitoring that an update of the operating software of the vehicle 800 is required. In another example, the software management cloud 809 may receive a user request requesting an update of the operating software of the vehicle 800 from the vehicle 800 through the gateway 805 and provide data for updating the operating software of the vehicle 800 based on the received user request. However, the present disclosure is not limited to the specific description above.

Figure 9:
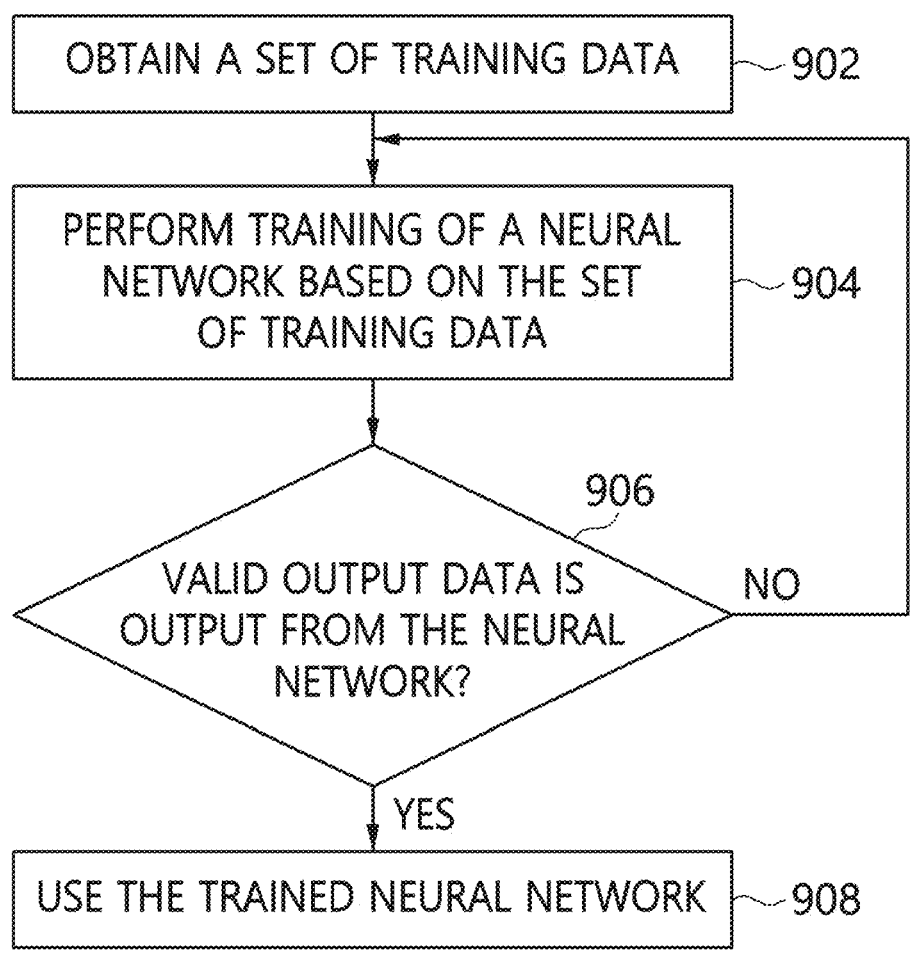
FIG. 9 illustrates the operation of an electronic device that trains a neural network based on a set of training data according to one embodiment.

FIG. 9 illustrates the operation of an electronic device 101 training a neural network based on a training dataset according to one embodiment.

Referring to FIG. 9, in the step 902, the electronic device according to one embodiment may obtain a training dataset. The electronic device may obtain a set of training data for supervised learning. The training data may include a pair of input data and ground truth data corresponding to the input data. The ground truth data may represent output data to be obtained from a neural network that has received input data that is a pair of the ground truth data.

For example, when a neural network is trained to recognize an image, training data may include images and information on one or more subjects included in the images. The information may include a category or class of a subject identifiable through an image. The information may include the position, width, height, and/or size of a visual object corresponding to the subject in the image. The set of training data identified through the operation of step 902 may include a plurality of training data pairs. In the above example of training a neural network for image recognition, the set of training data identified by the electronic device may include a plurality of images and ground truth data corresponding to each of the plurality of images.

Referring to FIG. 9, in the step 904, the electronic device according to one embodiment may perform training on a neural network based on a set of training data. In one embodiment in which the neural network is trained based on supervised learning, the electronic device may provide input data included in the training data to an input layer of the neural network. An example of a neural network including the input layer will be described with reference to FIG. 10. From the output layer of the neural network that has received the input data through the input layer, the electronic device may obtain output data of the neural network corresponding to the input data.

In one embodiment, the training in the step 904 may be performed based on a difference between the output data and the ground truth data included in the training data and corresponding to the input data. For example, the electronic device may adjust one or more parameters (e.g., weights described later with reference to FIG. 13) related to the neural network to reduce the difference based on the gradient descent algorithm. The operation of the electronic device that adjusts one or more parameters may be referred to as the tuning of the neural network. The electronic device may perform tuning of the neural network based on the output data using a function defined to evaluate the performance of the neural network, such as a cost function. A difference between the output and ground truth data may be included as one example of the cost function.

Referring to FIG. 9, in the step 906, the electronic device according to one embodiment may identify whether valid output data is output from the neural network trained in the step 904. That the output data is valid may mean that a difference (or a cost function) between the output and ground truth data satisfies a condition set to use the neural network. For example, when the average value and/or the maximum value of the differences between the output and ground truth data is less than or equal to a predetermined threshold value, the electronic device may determine that valid output data is output from the neural network.

When valid output data is not output from the neural network (No in the step 906), the electronic device may repeatedly perform training of the neural network based on the operation of the step 904. The embodiment is not limited to the specific description, and the electronic device may repeatedly perform the operations of steps 902 and 904.

When valid output data is obtained from the neural network (Yes in the step 906), the electronic device according to one embodiment may use the trained neural network based on the operation of the step 908. For example, the electronic device may provide input data different from those supplied to the neural network as training data. The electronic device may use the output data obtained from the neural network that has received the different input data as a result of performing inference on the different input data based on the neural network.

Figure 10:
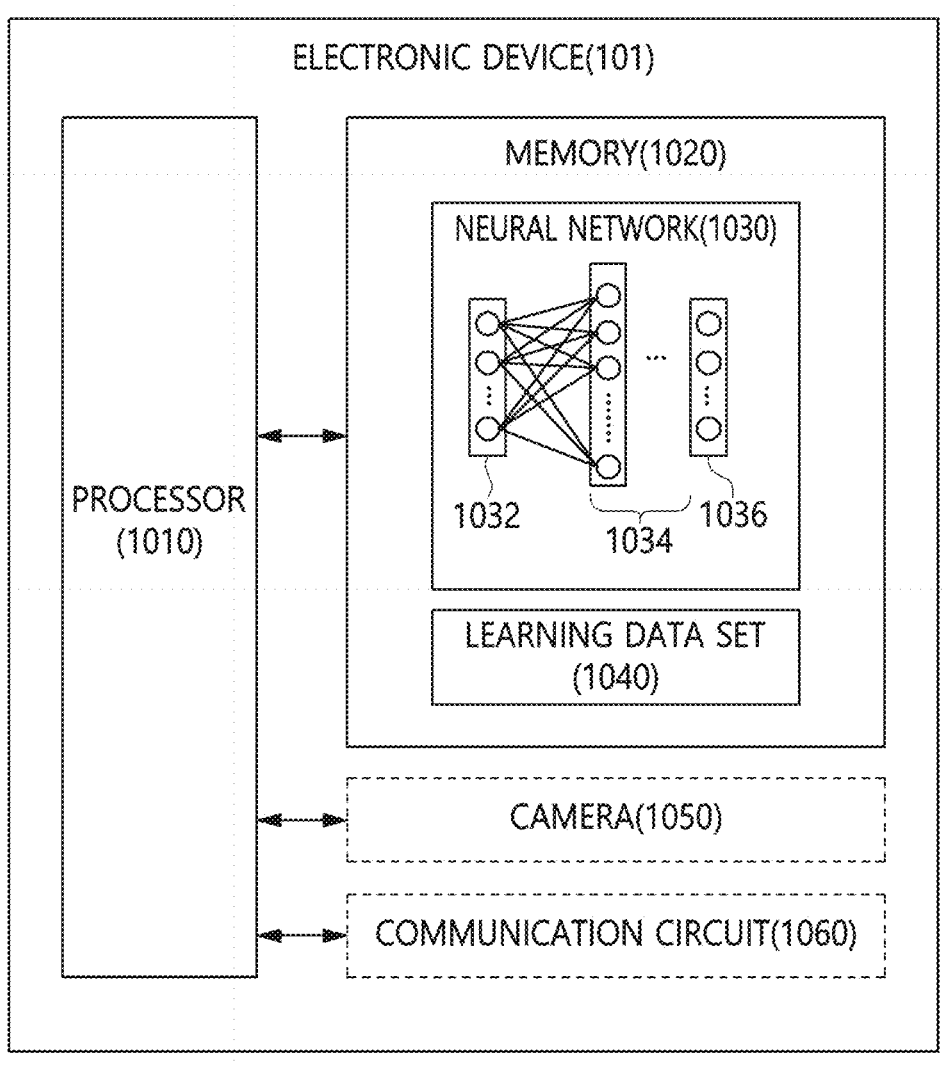
FIG. 10 is a block diagram of an electronic device according to one embodiment.

FIG. 10 is a block diagram of an electronic device 101 according to one embodiment.

Referring to FIG. 10, the processor 1010 of the electronic device 101 may perform computations related to the neural network 1030 stored in the memory 1020. The processor 1010 may include at least one of a center processing unit (CPU), a graphic processing unit (GPU), or a neural processing unit (NPU). The NPU may be implemented as a chip separate from the CPU or integrated into the same chip as the CPU in the form of a system on a chip (SoC). The NPU integrated into the CPU may be referred to as a neural core and/or an artificial intelligence (AI) accelerator.

Referring to FIG. 10, the processor 1010 may identify the neural network 1030 stored in the memory 1020. The neural network 1030 may include a combination of an input layer 1032, one or more hidden layers 1034 (or intermediate layers), and output layers 1036. The layers above (e.g., the input layer 1032, one or more hidden layers 1034, and the output layer 1036) may include a plurality of nodes. The number of hidden layers 1034 may vary depending on embodiments, and the neural network 1030 including a plurality of hidden layers 1034 may be referred to as a deep neural network. The operation of training the deep neural network may be referred to as deep learning.

In one embodiment, when the neural network 1030 has a structure of a feed-forward neural network, a first node included in a specific layer may be connected to all of the second nodes included in a different layer before the specific layer. In the memory 1020, parameters stored for the neural network 1030 may include weights assigned to the connections between the second nodes and the first node. In the neural network 1030 having the structure of a feed-forward neural network, the value of the first node may correspond to a weighted sum of values assigned to the second nodes, which is based on weights assigned to the connections connecting the second nodes and the first node.

In one embodiment, when the neural network 1030 has a convolutional neural network structure, a first node included in a specific layer may correspond to a weighted sum of part of the second nodes included in a different layer before the specific layer. Part of the second nodes corresponding to the first node may be identified by a filter corresponding to the specific layer. Parameters stored for the neural network 1030 in the memory 1020 may include weights representing the filter. The filter may include, among the second nodes, one or more nodes to be used to compute the weighted sum of the first node and weights corresponding to each of the one or more nodes.

The processor 1010 of the electronic device 101 according to one embodiment may perform training on the neural network 1030 using the training dataset 1040 stored in the memory 1020. Based on training data set 1040, the processor 1010 may adjust one or more parameters stored in memory 1020 for the neural network 1030 by performing the operations described with reference to FIG. 9.

The processor 1010 of the electronic device 101 according to one embodiment may use the neural network 1030 trained based on the training data set 1040 to perform object detection, object recognition, and/or object classification. The processor 1010 may input images (or video) captured through the camera 1050 to the input layer 1032 of the neural network 1030. Based on the input layer 1032 which has received the images, the processor 1010 may sequentially obtain the values of nodes of the layers included in the neural network 1030 and obtain a set of values of nodes of the output layer 1036 (e.g., output data). The output data may be used as a result of inferring information included in the images using the neural network 1030. The embodiment is not limited to the specific description above, and the processor 1010 may input images (or video) captured from an external electronic device connected to the electronic device 101 through the communication circuit 1060 to the neural network 1030.

In one embodiment, the neural network 1030 trained to process an image may be used to identify a region corresponding to a subject in the image (object detection) and/or the class of the subject expressed in the image (object recognition and/or object classification). For example, the electronic device 101 may use the neural network 1030 to segment a region corresponding to the subject within the image based on a rectangular shape such as a bounding box. For example, the electronic device 101 may use the neural network 1030 to identify at least one class matching the subject from among a plurality of designated classes.

In what follows, a speed bump according to an embodiment of the present disclosure should be understood preferably as a concept encompassing a speed bump with physical irregularities and a speed bump painted on a flat road without the physical irregularities.

For the convenience of description, a painted speed bump with physical irregularities is referred to as a "first speed bump," while a painted speed bump without the physical irregularities is referred to as a "second speed bump."

In general, when a vehicle designed to drive on a flat road passes a speed bump installed on the road during driving, the vehicle encounters a physical impact; if the physical impact is repeatedly applied to the vehicle, the vehicle's life is reduced significantly. Therefore, the present disclosure may provide specific information on the speed bumps to other vehicles driving on the road by identifying first speed bumps with physical irregularities and second speed bumps without the physical irregularities through computer vision techniques and managing location information of the identified first speed bumps and location information of the identified second speed bumps in a database.

Figure 11:
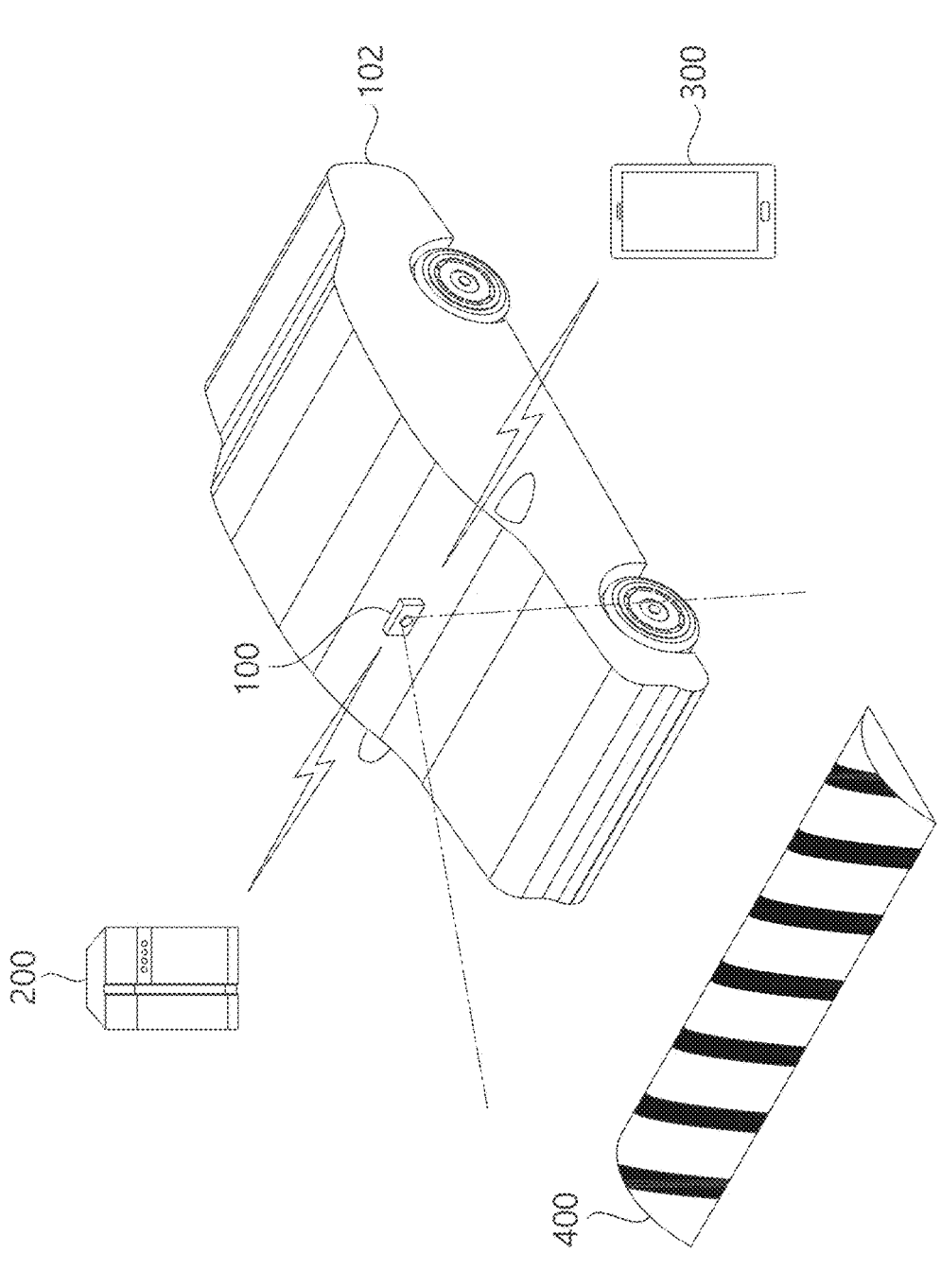
FIG. 11 is a conceptual structure of a vehicle service system according to one embodiment.
Figure 12:
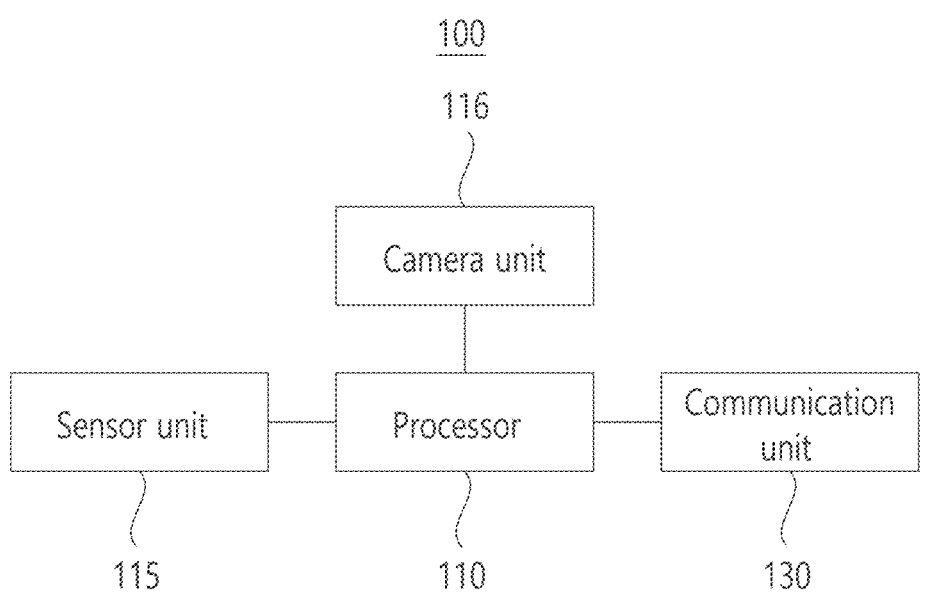
FIG. 12 is a block diagram of a vehicular electronic device according to one embodiment.

FIG. 11 is a conceptual structure of a vehicle service system according to one embodiment, and FIG. 12 is a block diagram of a vehicular electronic device according to one embodiment.

Referring to FIGS. 11 and 12, a vehicular electronic device 100 according to one embodiment may comprise an camera unit 116 capturing an image in front of a vehicle; a sensor unit 115 determining the location of the vehicle; a processor 110 detecting the speed bump from the image in front of the vehicle by processing the image, determining whether the speed bump includes physical irregularities after the vehicle passes the speed bump, and generating speed bump information by using at least one of information on the location of the speed bump and information on whether the speed bump includes irregularities; and a communication unit 130 transmitting the speed bump information to a vehicle service providing server.

The vehicular electronic device 100 may capture the images in front of the vehicle 102. The vehicular electronic device 100 may determine the current location of the vehicle 102. The vehicular electronic device 100 may detect the speed bump 400 through image processing. The vehicular electronic device 100 may determine the degree of change in the image after the vehicle passes the speed bump 400. The vehicular electronic device 100 may determine whether the speed bump includes physical irregularities based on the degree of change in the image.

The vehicular electronic device 100 may generate speed bump information related to the location of the speed bump and whether the speed bump includes physical irregularities. The vehicular electronic device 100 may determine the location of the speed bump 400 based on the vehicle's location measured by the sensor unit 115 and the image captured by the camera unit 116. The vehicular electronic device 100 may determine whether the speed bump includes physical irregularities based on the degree of change in the image. The vehicular electronic device 100 may transmit speed bump information to the vehicle service providing server 200.

The vehicle service providing server 200 may receive speed bump information from the vehicular electronic device 100. The vehicle service providing server 200 may generate integrated speed bump information by integrating speed bump information received from a plurality of vehicular electronic devices 100. The integrated speed bump information may include information for distinguishing between virtual speed bumps on the flat road painted only with patterns and colors but having no physical irregularities and actual speed bumps with physical bumps. The vehicular electronic device 100 may receive the integrated speed bump information and provide a notification service to the vehicle driver when an actual speed bump is detected ahead.

The vehicle service providing server 200 may transmit the integrated speed bump information to the user terminal 300, which uses a navigation service. The user terminal 300 may receive information on whether a speed bump includes physical irregularities through the navigation service; however, it should be noted that the above description is related to just one embodiment, and the present disclosure is not limited to the specific embodiment.

The processor 110 may process/analyze an image captured by the camera unit 116. The processor 110 may detect a speed bump by processing the captured image. Specifically, the processor 110 may identify a speed bump from an image in front of the vehicle obtained by the camera unit 115 through a deep learning model. The processor 110 may measure the degree of change in the image before and after the vehicle passes the speed bump. The processor 110 may determine whether the speed bump includes physical irregularities based on the degree of change in the image.

The processor 110 may calculate the location of the speed bump based on the vehicle's location measured by the sensor unit 115 and the image captured by the camera unit 116. The processor 110 may generate speed bump information related to the location of the speed bump and whether the speed bump includes physical irregularities.

Specifically, when a speed bump is identified from the image obtained by the camera unit 116, the processor 110 may determine the boundary of the identified speed bump and generate a bounding box. At this time, to detect a speed bump present in the image, the processor 110 may use an object detection method for detecting objects present in the image. For example, the processor 110 may use a deep learning-based object detection model to detect a speed bump within the image.

Specifically, the deep learning-based object detection model according to one embodiment may include, but is not limited to, a two-stage detector model such as the Regions with Convolutional Neural Networks features (R-CNN) series (e.g., Fast R-CNN, Faster R-CNN, or Mask R-CNN), in which regional proposal and detection are performed sequentially, and a one-stage detector model such as the You Only Look Once (YOLO) detector and the Single-Shot Multibox Detector (SSD), in which regional proposal and detection are performed simultaneously (i.e., region proposal is processed in one-stage).

The processor 110 may generate an arbitrary point at a first point of the hood of the vehicle (the farthest point in the hood toward the front of the vehicle). The processor 110 may calculate the location of a speed bump based on the correlation between the bounding box and the point.

The processor 110 may specify a first time point that serves as a criterion for determining whether a speed bump includes physical irregularities based on the correlation between the bounding box and the point. The processor 110 may specify the first time right before the vehicle crosses the speed bump based on the distance between the bounding box and a virtual point set at the first point of the vehicle's hood. For example, the processor 110 may define the first time point as the time when an edge of the bounding box closest to the vehicle overlaps the virtual point in a frame among captured images from the camera unit 116.

The processor 110 may determine whether there is a vertical movement of the vehicle within a predetermined time period after the first time. The processor 110 may extract a plurality of feature points from the image captured by the camera unit 116. The processor 110 may extract a plurality of feature points from each frame of the images obtained by the camera unit 116 and match the plurality of feature points extracted from each frame.

Specifically, the processor 110 may compare a plurality of feature points extracted from the first frame of the image and a plurality of feature points extracted from the second frame and calculate a matching relationship between feature points of the first frame and feature points of the second frame. The processor 110 according to an embodiment of the present disclosure may set feature points extracted from the frame corresponding to the image obtained right before the vehicle enters the speed bump as reference feature points.

Then, the processor 110 may determine whether the vehicle moves in the up and down direction when it passes a speed bump by tracking feature points corresponding to the reference feature points for each frame of the image obtained by the camera unit 116. Specifically, the processor 110 may determine whether the vehicle moves in the up and down direction when it passes a speed bump by determining a matching relationship between the feature points within an image frame (first image frame) right before the vehicle enters the speed bump and the feature points within an image frame (second image frame) right after the vehicle passes the speed bump. Specifically, the processor 110 may calculate the vertical movement range between the feature points of the first image frame and the feature points of the second image frame and obtain an average movement in the vertical direction of the feature points based on the calculated movement range. In the present disclosure, for the convenience of description, the feature points identified in the first image frame are defined as a first feature point group, and the feature points identified in the feature points matching the features points identified in the first image frame (the first feature point group) as a second feature point group.

The processor 110 may calculate the average value of the degree of vertical movement of a plurality of reference points when the frame changes and track the presence or absence of a vertical movement pattern generated when the vehicle passes a speed bump. In the presence of the vertical movement pattern, the processor 110 may determine the speed bump the vehicle passes as a first speed bump with physical irregularities.

The processor 110 may generate a vertical movement graph showing the average vertical movement over time between the first feature point group, which comprises a plurality of feature points of the first image frame, and the second feature point group of the second image frame. The processor 110 may use the average vertical movement at each feature point included in the first and second feature point groups generated due to the driving of the vehicle to remove noise due to the vehicle's vibration during driving from the generated vertical movement graph. For example, the processor 110 may apply a lowpass filter to remove noise from the average value of vertical movement between first and second feature point groups, but the present disclosure is not limited to the specific description.

The camera unit 116 may capture the scene around the vehicle. The camera unit 116 may capture the image including a speed bump present in the vehicle's driving direction.

The sensor unit 115 may determine the location of the vehicle. The sensor unit 115 may measure the location of the vehicle using GPS signals received from the Global Positioning System (GPS) satellites, but the present disclosure is not limited to the specific description. The sensor unit 115 may provide the location of the vehicle measured at regular intervals to the processor 110.

The communication unit 130 may transmit speed bump information generated by the processor 110 to the vehicle service providing server. The communication unit 130 may receive, from the vehicle service providing server, integrated speed bump information obtained by integrating speed bump information collected from a plurality of different vehicles.

The processor 110 may provide an alarm service based on the integrated speed bump information when a speed bump ahead of the vehicle includes physical irregularities. The vehicular electronic device may include a display unit or a speaker capable of providing an alarm service, but the present disclosure is not limited to a specific type of notification service.

The processor 110 may assess the proper operation of a speed bump detection function by referencing pre-stored map data and confirming the vehicle's proximity to an area with a speed bump. When a speed bump is identified from the image obtained by the camera unit 116, the processor 110 may determine whether the speed bump includes physical irregularities through the embodiment above.

The processor 110 may determine whether a speed bump is erroneously detected by using an object tracking model generated based on a machine learning technique. The object tracking model according to one embodiment may be either the centroid tracker or the Simple Online and Realtime Tracking (SORT).

Figure 13:
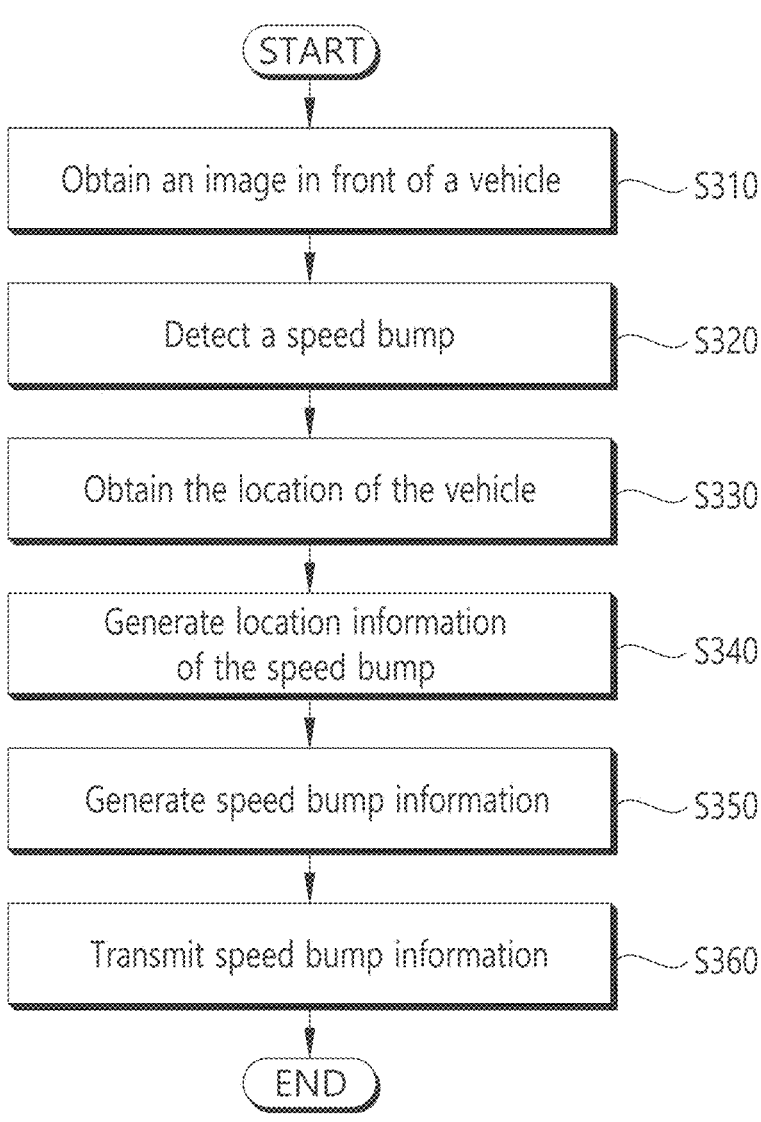
FIG. 13 is a flow diagram illustrating a method for controlling a vehicular electronic device according to one embodiment.
Figure 14:
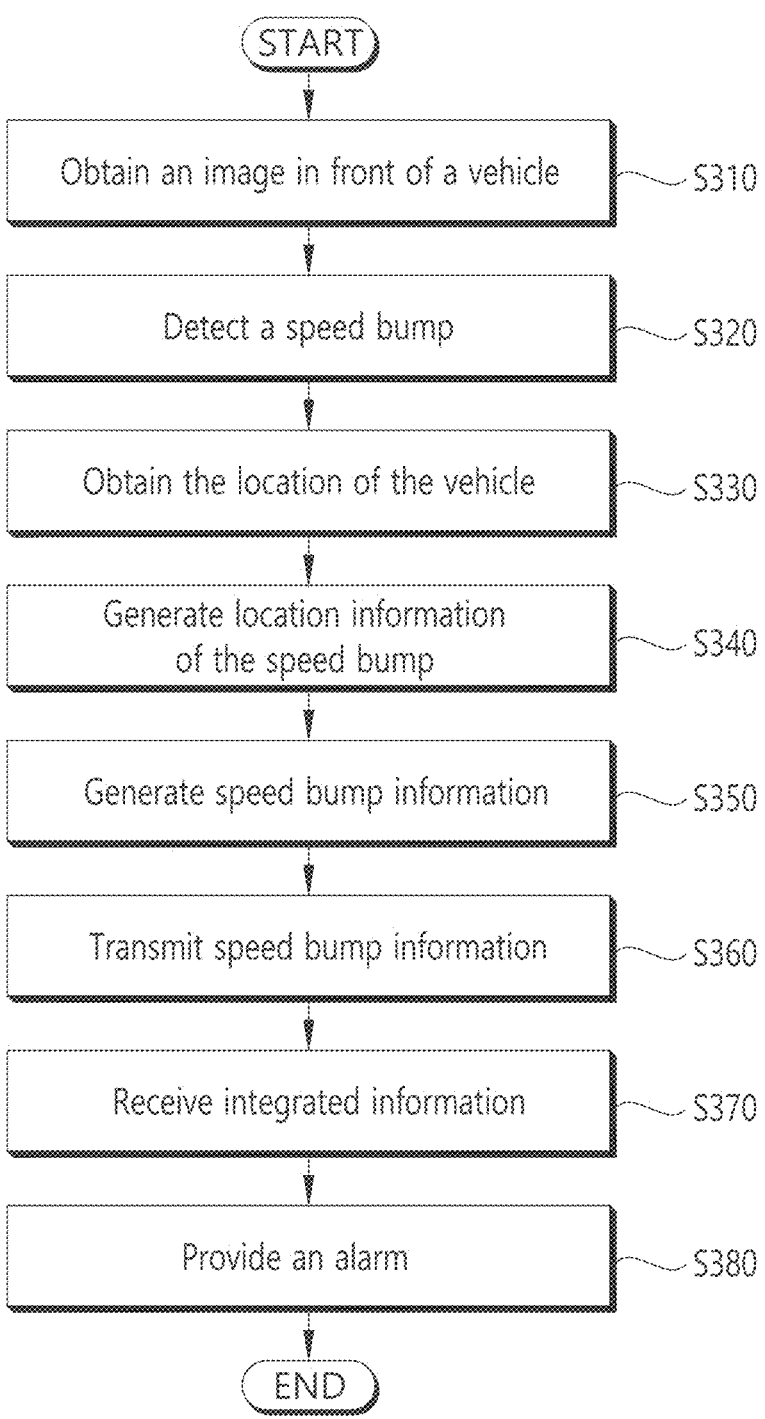
FIG. 14 is a flow diagram illustrating a method for controlling a vehicular electronic device according to one embodiment.

FIGS. 13 and 14 are flow diagrams illustrating a method for controlling a vehicular electronic device according to one embodiment.

Referring to FIG. 13, a method for controlling a vehicular electronic device according to one embodiment may comprise capturing an image in front of a vehicle S310, detecting a speed bump for detecting a speed bump from the captured front image S320; obtaining information on the vehicle's location for obtaining the location information of the vehicle S330, generating location information of a speed bump for generating location information of the speed bump based on the obtained location information of the vehicle S340, generating speed bump information for determining whether the speed bump includes physical irregularities and generating speed bump information using at least one of information on whether the speed bump includes the irregularities and information on the location of the speed bump S350, and transmitting speed bump information for transmitting the speed bump information to a vehicle service providing server S360.

In the step of image capturing S310, the camera unit may capture an image in front of the vehicle.

In the step of detecting a speed bump S320, the processor may detect a speed bump by processing an image captured by the camera unit.

In the step of obtaining location information S330, the processor may determine the vehicle's current location and calculate the location of the speed bump based on the vehicle's current location. In the step of generating location information of the speed bump S340, the processor may specify the location of the speed bump right before the vehicle passes the speed bump and generate location information of the speed bump.

In the step of generating speed bump information S350, the processor may determine whether the speed bump includes physical irregularities by measuring the degree of change between the first feature point group of an image frame right before the vehicle passes the speed bump and the second feature point group of an image frame after the vehicle passes the speed bump. In the step of generating speed bump information S350, the processor specify a first time point right before the vehicle crosses the speed bump based on the distance between the bounding box representing the boundary of the speed bump and a virtual point set at the front end of the vehicle's hood.

In the step of generating speed bump information S350, the processor may determine whether there is a vertical movement of the vehicle within a predetermined time period after the first time point. In the step of generating speed bump information S350, the processor may extract a plurality of feature points from the first image frame and the second image frame, compare the feature points of the first image frame and those of the second image frame, and set those matching feature points as reference points.

In the step of generating speed bump information S350, the processor may calculate an average value of the degree of vertical movement of the plurality of reference points and track the presence of a vertical movement pattern generated when the vehicle crosses a speed bump. In the step of generating speed bump information S350, in the presence of the vertical movement pattern, the processor may determine that the speed bump includes physical irregularities. In the step of generating speed bump information S350, the processor may generate speed bump information that includes at least one of information on the location of the speed bump and information on whether the speed bump includes physical irregularities.

In the step of transmitting speed bump information S360, the communication unit may transmit the speed bump information to the vehicle service providing server.

Referring to FIG. 14, a method for controlling a vehicular electronic device according to one embodiment may further comprise receiving integrated speed bump information for receiving, from the vehicle service providing server, integrated speed bump information obtained by integrating speed bump information collected from different vehicles S370, providing an alarm service for providing an alarm service based on the integrated speed bump information only when a speed bump in front of the vehicle is a first speed bump with physical irregularities S380, and determining erroneous detection for determining whether the detecting of the speed bump has erroneously detected a speed bump.

In the step of receiving integrated speed bump information S370, the communication unit may receive, from the vehicle service providing server, integrated speed bump information obtained by integrating speed bump information collected from different vehicles. In the step of providing an alarm service S380, the processor may provide an alarm service based on the integrated speed bump information only when the speed bump in front of the vehicle includes physical irregularities. A method for providing an alarm service may be visual or auditory, but the present disclosure is not limited to a specific type of implementation.

In the step of determining erroneous detection, the processor may track whether detection of a speed bump is correct based on a plurality of image frames captured by the camera unit. In the step of determining erroneous detection, the processor may determine whether a speed bump is erroneously detected by using an object tracking model generated based on a machine learning technique.

Figure 15:
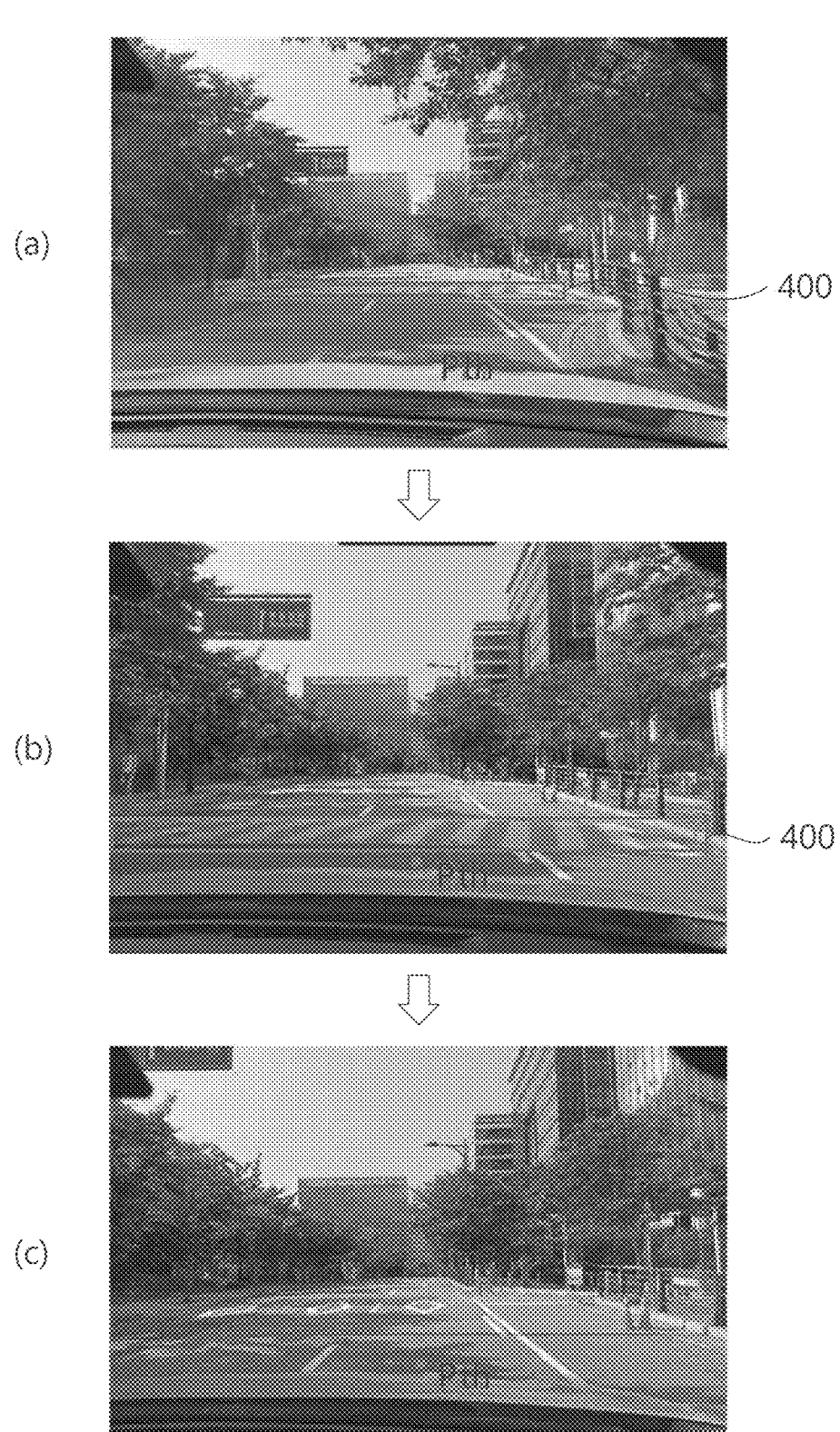
FIGS. 15 to 17 are conceptual drawings related to the operation of a vehicular electronic device according to one embodiment.
Figure 16:
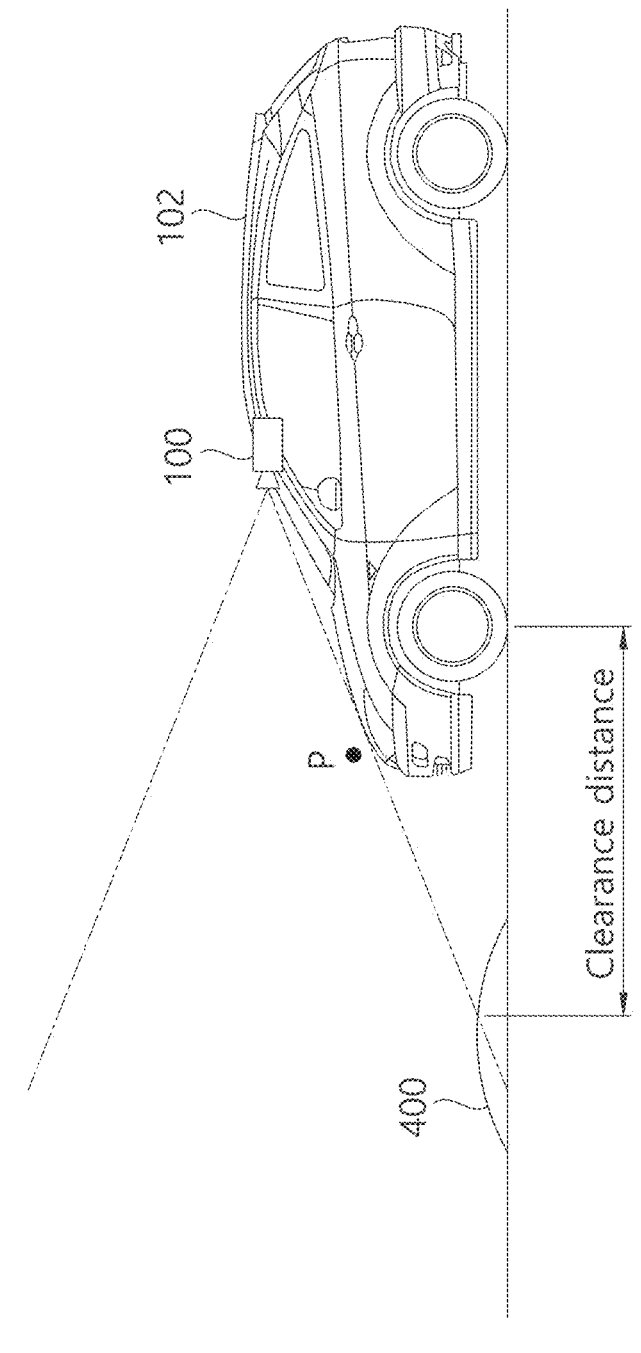
Figure 17:
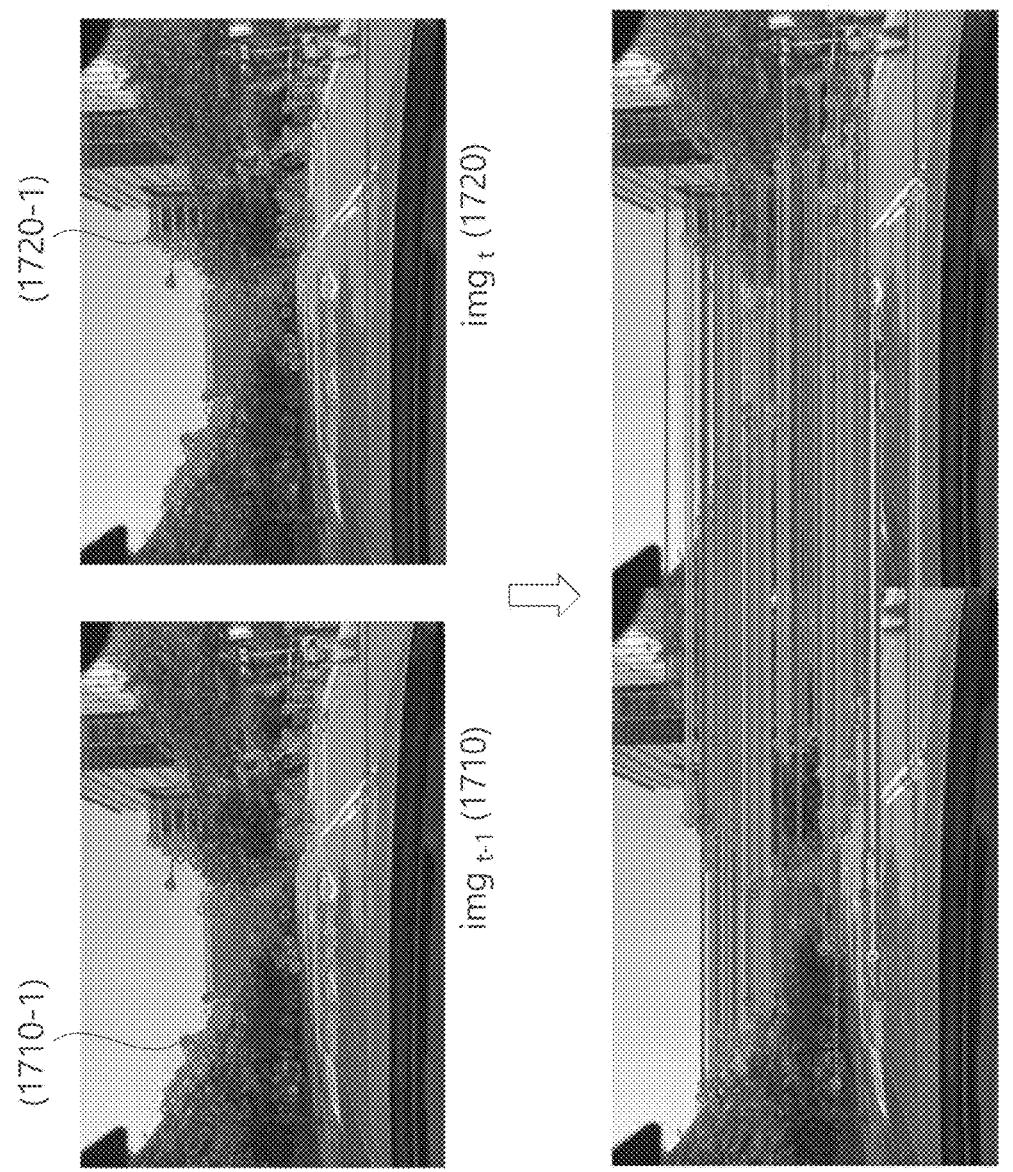

FIGS. 15 to 17 are conceptual drawings related to the operation of a vehicular electronic device according to one embodiment.

Referring to FIG. 15, the vehicular electronic device may detect a bounding box 400 for identifying a speed bump from a captured image of the road in front of a vehicle (a). The vehicular electronic device may set a virtual point P at one point of the vehicle's hood. The vehicular electronic device may detect a change in the distance between the bounding box 400 and the point P to determine the location of the speed bump. The vehicular electronic device may assess the proper operation of a speed bump detection function based on image frames included in the images captured while the vehicle approaches the location of the speed bump.

The vehicular electronic device may detect a change in the distance between the bounding box 400 and point P to specify the time right before the vehicle crosses a speed bump. The time right before the vehicle crosses the speed bump may be the time point C when point P overlaps the side of the bounding box 400 closest to the vehicle, but the present disclosure is not limited to the specific condition.

For example, when the coordinates of the virtual point is $P(x, y)$, the time point $t_0$, when the bounding box of the speed bump intersects the coordinates $P(x, y)$ of the virtual point, may be determined as the time point when the vehicle is about to step on the speed bump.

Referring to FIG. 16, a virtual point P may be set, but may not be limited, at an intersection point where the lower limit of field of view of the vehicular electronic device 100 meets the front end of the hood. The virtual point P is only one of criteria for specifying the time right before the vehicle 102 crosses the speed bump 400.

The designation of coordinates $P(x, y)$ for the virtual point may be intended to exclude scenarios where the vehicle avoids the speed bump 400 by reversing or executing evasive maneuvers such as driving through the shoulder. At $t_0$, a clearance distance may exist before the speed bump 400 makes contact with the front wheels of the vehicle, and the clearance distance may vary depending on the viewing angle at the mounting position of the vehicular electronic device (camera) or the overhang of each vehicle.

Referring to FIG. 17, the vehicular electronic device may compare a plurality of image frames captured by the camera unit with each other. The vehicular electronic device may determine the presence of irregularities on a speed bump during the time interval from $t_0$ when the vehicle starts to cross the speed bump to $t_n$ representing the predefined final time point. The vehicular electronic device may analyze each frame of the images between $t_0$ and the predefined final time point $t_n$.

The vehicular electronic device may compare the first frame $img_{t-1}$ 1710 of an image of the road in front of the vehicle captured at the first time point by the camera unit with the second frame $img_t$ 1720 of an image of the road in front of the vehicle captured at the second time point.

In FIG. 17, the drawing denoted as 1750 illustrates a matching relationship between the first feature point groups 1710-1 of the first frame $img_{t-1}$ 1710 and the second feature point groups 1720-1 of the second frame $img_t$ 1720.

Specifically, the vehicular electronic device according to one embodiment may determine the vehicle movement based on the detection of a difference between the first feature point groups 1710-1 extracted from the first frame $img_{t-1}$ 1710 and the second feature point groups 1720-1 extracted from the second frame $img_t$ 1720.

The first frame 1710 and the second frame 1720 may correspond to the frames captured at specific time points between $t_0$ and $t_n$. For example, the first frame 1710 may represent the frame at time $t-1$, while the second time frame 1720 may represent the frame at time t.

For example, the vehicular electronic device may extract feature points $f_{t-1}$ of the image frame 1710 at time $t-1$ and feature points $f_t$ of the image frame 1720 at time t.

The vehicular electronic device may compare the feature points $f_{t-1}$ of the image frame at time $t-1$ with feature points $f_t$ of the image frame at time t. For example, the vehicular electronic device may match $f_{t-1}$ to $f_t$ based on the equation $p_t = f_{t-1} \cap f_t$. The vehicular electronic device may use Oriented and FAST and Rotated BRIEF (ORB) features for tests, but the present disclosure is not limited to the specific example. The vehicular electronic device may perform feature matching using the Brute-Force Matcher (BFMater), but the present disclosure is not limited to the specific example.

The vehicular electronic device may set those matching feature points among a plurality of feature point groups 1710-1 from the first frame 1710 and a plurality of feature point groups 1720-1 from the second frame 1720 as reference points (f).

The vehicular electronic device may detect vertical movement of the plurality of reference points in the image. Positions of the plurality of reference points may vary for each image frame. The vehicular electronic device may track and quantify the vertical change of the plurality of reference points according to the frame change. The vehicular electronic device may calculate an average value of the degree of vertical change of the plurality of reference points. For example, the vehicle reference device may derive the average vertical movement $\bar{y}_t$ of the vehicle by using the equation $\bar{y}_t = \Sigma y_i / n$, $y_i \in p_t$. $p_t$ represents the feature point at time t, and $\bar{y}_t$ represents the average vertical movement of feature points between frames, which may be used for estimation of the vehicle's vertical movement. At this time, in the equation above, i represents the image frame number, and n represents the number of the last image frame.

Depending on the specific feature point, it may correspond to a moving object, such as a nearby vehicle or person, or to a stationary object, such as a tree or a building in the upper part of an image or a road in the lower part of the image; therefore, the average value along the y axis is calculated for all matched feature points in the image.

The vehicular electronic device may display the change in the average value of the degree of vertical change of a plurality of reference points as a graph. The vehicular electronic device may remove noise from the average value of the degree of vertical change of a plurality of reference points. For example, the vehicular electronic device may generate a graph of vertical movement of reference points by removing noise from the changes in the average value of the degree of vertical movement of a plurality of reference points by applying a low pass filter to the changes. In the reference point vertical movement graph, x axis may correspond to time, and y axis may correspond to height. The vehicular electronic device may remove noise due to the vehicle's vibration during driving based on the formula $h_t = a \cdot h_{t-1} + (1-a) \cdot \bar{y}_t$, $0 < a < 1$, but the present disclosure is not limited to the specific description. $h_t$ represents the change in height when a vehicle passes a speed bump, which is a value obtained by removing noise from $\bar{y}_t$.

Figure 18:
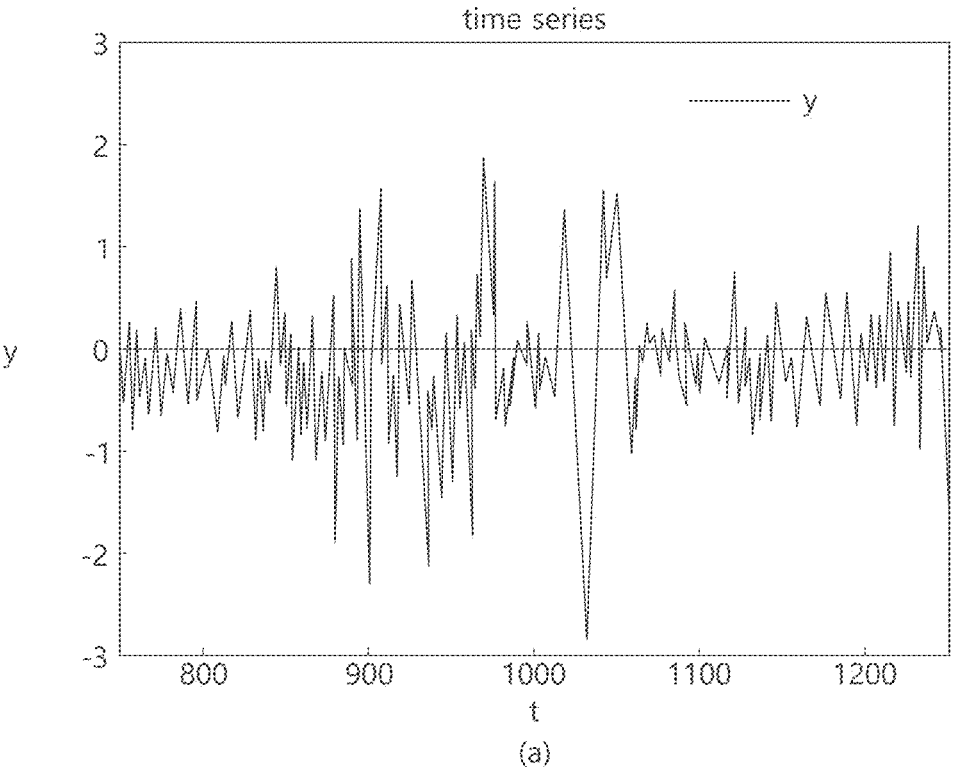
FIGS. 18 and 19 are graphs illustrating a waveform due to vertical motion of an image captured by a vehicular electronic device according to one embodiment.
Figure 18:
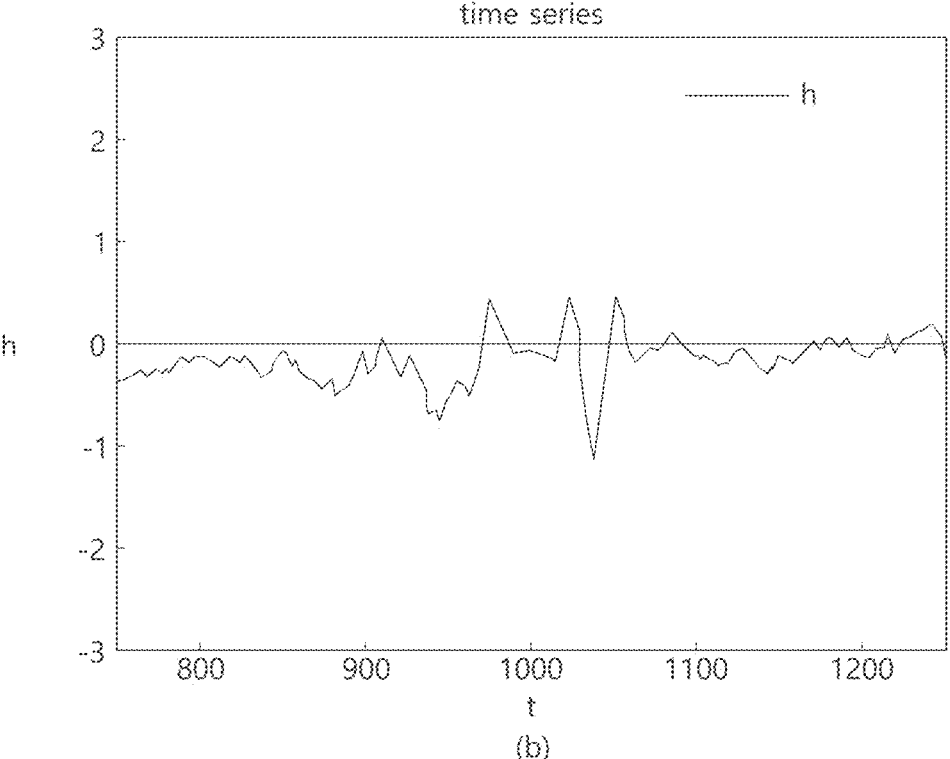
Figure 19:
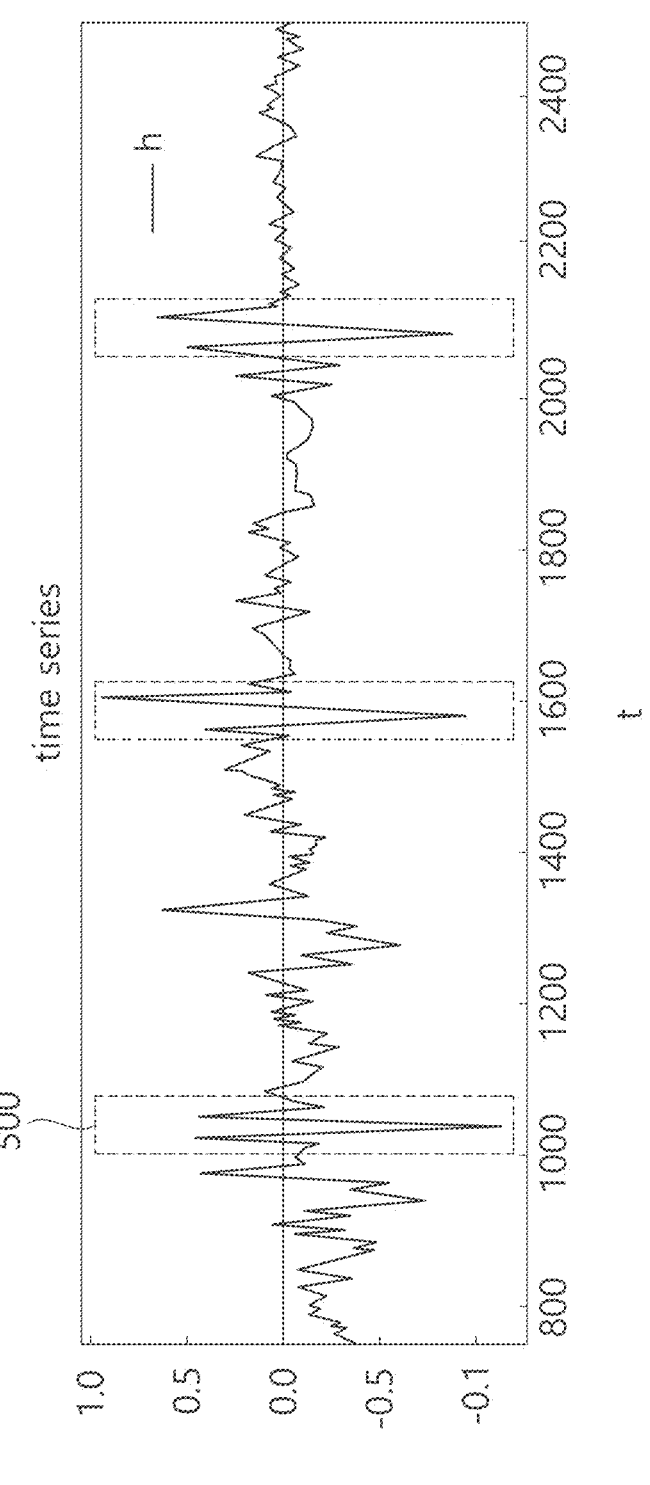

FIGS. 18 and 19 are graphs illustrating waveforms due to vertical movement an image captured by a vehicular electronic device according to one embodiment.

Referring to FIG. 18, (a) shows the average value $\bar{y}_t$ of y axis coordinates, and (b) shows $h_t$. The figure shows that $h_t$ exhibits significantly reduced noise compared to $\bar{y}_t$. Referring to FIG. 19, variation in the $h_t$ value may be checked when an actual vehicle passes a speed bump during driving. The vertical movement pattern generated when the vehicle crosses a speed bump may have an M shape. The above specific pattern may be frequently observed when a speed bump is equipped with irregularities, leading to an increase and subsequent decrease in the pitch angle of a vehicle. The vehicular electronic device may detect the vertical movement pattern from $h_t$ and determine whether the corresponding speed bump is equipped with irregularities. If the M-shaped pattern is detected, the vehicular electronic device may determine that the detected speed bump is an actual speed bump equipped with irregularities. If the M-shaped pattern is not detected, the vehicular electronic device may determine that the detected speed bump does not have irregularities. The vehicular electronic device may generate speed bump information related to the location of the speed bump and whether the speed bump includes irregularities.

The vehicular electronic device may receive integrated speed bump information obtained by integrating speed bump information provided by a plurality of vehicular electronic devices from the vehicle service providing server. The vehicular electronic device may provide a notification service when an actual speed bump is detected in front of the vehicle based on integrated speed bump information.

FIGS. 20 and 21 are flow diagrams illustrating a method for controlling a vehicular electronic device according to one embodiment.

Referring to FIG. 20, a vehicular electronic device may analyze an image and identify a speed bump within the image S501. The vehicular electronic device may track the presence of a speed bump within images obtained during the driving of the vehicle S502. The vehicular electronic device may continuously evaluate the accuracy of speed bump identification. Through the tracking of the speed bump, the vehicular electronic device may detect a speed bump within an image S503.

The vehicular electronic device may specify a time point $t_0$ at which a speed bump is not identified within the image and extract feature points from the frame at that time point S504. The vehicular electronic device may extract feature points by analyzing a plurality of image frames from the moment the vehicle steps on a speed bump. For example, the vehicular electronic device may compare the frame at time $t_0$ with the frame at time t+1, which is the next frame S505. The vehicular electronic device may extract feature points from the frame at time t+1 S506. The vehicular electronic device may match feature points within the frame at time $t_0$ with feature points within the next frame at time t+1 S507.

The vehicular electronic device may calculate the average vertical movement of the reference points, which are matched feature points S508. The vehicular electronic device may remove noise due to the vehicle's vibration during driving from the average vertical movement of the reference points using a low pass filter (LPF) S509.

The vehicular electronic device may determine the presence of a vertical movement of the vehicle within a predetermined time period right before the vehicle crosses a speed bump. From the vertical movement graph of the reference point, the vehicular electronic device may track the presence or absence of a vertical movement pattern generated during a predetermined time interval from the time right before the vehicle crosses the speed bump to the moment the vehicle crosses the speed bump S510. A vertical movement pattern generated when the vehicle crosses a speed bump may have an M shape. When the vertical movement pattern is detected S511, the vehicular electronic device may identify the speed bump as a first speed bump equipped with irregularities S513. When the vertical movement pattern is not detected within a predetermined time period S512, the vehicular electronic device may identify the speed bump as a second speed bump that does not have irregularities S514.

Referring to FIG. 21, when a speed bump is found in a captured image, the vehicular electronic device may provide a notification service only for speed bumps including irregularities based on integrated speed bump information S601. The vehicular electronic device may proceed with the determination of whether a speed bump includes irregularities the moment the vehicle crosses the speed bump S602. The vehicular electronic device may accumulate and store speed bump information, which is a result value obtained from the determination of whether the speed bump includes irregularities S603. The vehicular electronic device may transmit the accumulated and stored speed bump information to the server S604. The server may integrate the speed bump information S605 and transmit the integrated information to the vehicular electronic device S606. The vehicular electronic device may update the integrated speed bump information through continuous communication with the server and provide updated information to the driver.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

FIG. 11 is a conceptual structure of a vehicle service system according to one embodiment, and FIG. 12 is a block diagram of a vehicular electronic device according to one embodiment.

Referring to FIGS. 11 and 12, a vehicular electronic device 100 according to one embodiment may comprise an camera unit 116 capturing images in front of a vehicle, a sensor unit 115 determining the location of the vehicle, a processor 110 detecting a speed bump from the image in front of the vehicle by processing the image, determine whether the speed bump includes irregularities after the vehicle passes the speed bump, and generating speed bump information using at least one of information on the location of the speed bump and information on whether the speed bump includes irregularities, and a communication unit 130 transmitting the speed bump information to a vehicle service providing server.

The vehicular electronic device 100 may capture an image in front of the vehicle 102. The vehicular electronic device 100 may determine the current location of the vehicle 102. The vehicular electronic device 100 may detect the speed bump 400 through image processing. The vehicular electronic device 100 may determine the degree of change in the image after the vehicle passes the speed bump 400. The vehicular electronic device 100 may determine whether the speed bump includes irregularities based on the degree of change in the image.

The vehicular electronic device 100 may generate speed bump information related to the location of the speed bump and whether the speed bump includes irregularities. The vehicular electronic device 100 may determine the location of the speed bump 400 based on the vehicle's location measured by the sensor unit 115 and the image captured by the camera unit 116. The vehicular electronic device 100 may determine whether the speed bump includes irregularities based on the degree of change in the image. The vehicular electronic device 100 may transmit speed bump information to the vehicle service providing server 200.

The vehicle service providing server 200 may receive speed bump information from the vehicular electronic device 100. The vehicle service providing server 200 may generate integrated speed bump information by integrating speed bump information received from a plurality of vehicular electronic devices 100. The integrated speed bump information may include information for distinguishing between virtual speed bumps on the flat road painted only with patterns and colors but having no physical irregularities and actual speed bumps with physical bumps. The vehicular electronic device 100 may receive the integrated speed bump information and provide a notification service to the vehicle driver when an actual speed bump is detected ahead.

The vehicle service providing server 200 may transmit the integrated speed bump information to the user terminal 300, which uses a navigation service. The user terminal 300 may receive information on whether a speed bump includes physical irregularities through the navigation service; however, it should be noted that the above description is related to just one embodiment, and the present disclosure is not limited to the specific embodiment.

The processor 110 may process/analyze an image captured by the camera unit 116. The processor 110 may detect a speed bump by processing the captured image. Specifically, the processor 110 may identify a speed bump from an image in front of the vehicle obtained by the camera unit 116 through a deep learning model. The processor 110 may measure the degree of change in the image before and after the vehicle passes the speed bump. The processor 110 may determine whether the speed bump includes physical irregularities based on the degree of change in the image.

The processor 110 may calculate the location of the speed bump based on the vehicle's location measured by the sensor unit 115 and the image captured by the camera unit 116. The processor 110 may generate speed bump information related to the location of the speed bump and whether the speed bump includes physical irregularities.

Specifically, when a speed bump is identified from the image obtained by the camera unit 116, the processor 110 may determine the boundary of the identified speed bump and generate a bounding box. At this time, to detect a speed bump present in the image, the processor 110 may use an object detection method for detecting objects present in the image. For example, the processor 110 may use a deep learning-based object detection model to detect a speed bump within the image.

Specifically, the deep learning-based object detection model according to one embodiment may include, but is not limited to, a two-stage detector model such as the Regions with Convolutional Neural Networks features (R-CNN) series (e.g., Fast R-CNN, Faster R-CNN, or Mask R-CNN), in which regional proposal and detection are performed sequentially, and a one-stage detector model such as the You Only Look Once (YOLO) detector and the Single-Shot Multibox Detector (SSD), in which regional proposal and detection are performed simultaneously (i.e., region proposal is processed in one-stage).

The processor 110 may generate an arbitrary point at a first point of the hood of the vehicle (the farthest point in the hood toward the front of the vehicle). The processor 110 may calculate the location of a speed bump based on the correlation between the bounding box and the point.

The processor 110 may specify a first time point that serves as a criterion for determining whether a speed bump includes physical irregularities based on the correlation between the bounding box and the point. The processor 110 may specify the first time right before the vehicle crosses the speed bump based on the distance between the bounding box and a virtual point set at the first point of the vehicle's hood. For example, the processor 110 may define the first time point as the time when an edge of the bounding box closest to the vehicle overlaps the virtual point in a frame among captured images from the camera unit 116.

The processor 110 may determine whether there is a vertical movement of the vehicle within a predetermined time period after the first time. The processor 110 may extract a plurality of feature points from the image captured by the camera unit 116. The processor 110 may extract a plurality of feature points from each frame of the images obtained by the camera unit 116 and match the plurality of feature points extracted from each frame.

Specifically, the processor 110 may compare a plurality of feature points extracted from the first frame of the image and a plurality of feature points extracted from the second frame and calculate a matching relationship between feature points of the first frame and feature points of the second frame. The processor 110 according to an embodiment of the present disclosure may set feature points extracted from the frame corresponding to the image obtained right before the vehicle enters the speed bump as reference feature points.

Then, the processor 110 may determine whether the vehicle moves in the up and down direction when it passes a speed bump by tracking feature points corresponding to the reference feature points for each frame of the image obtained by the camera unit 116. Specifically, the processor 110 may determine whether the vehicle moves in the up and down direction when it passes a speed bump by determining a matching relationship between the feature points within an image frame (first image frame) right before the vehicle enters the speed bump and the feature points within an image frame (second image frame) right after the vehicle passes the speed bump.

Specifically, the processor 110 may calculate the vertical movement range between the feature points of the first image frame and the feature points of the second image frame and obtain an average movement in the vertical direction of the feature points based on the calculated movement range. In the present disclosure, for the convenience of description, the feature points identified in the first image frame are defined as a first feature point group, and the feature points identified in the feature points matching the features points identified in the first image frame (the first feature point group) as a second feature point group.

The processor 110 may calculate the average value of the degree of vertical movement of a plurality of reference points when the frame changes and track the presence or absence of a vertical movement pattern generated when the vehicle passes a speed bump. In the presence of the vertical movement pattern, the processor 110 may determine the speed bump the vehicle passes as a first speed bump with physical irregularities.

The processor 110 may generate a vertical movement graph showing the average vertical movement over time between the first feature point group, which comprises a plurality of feature points of the first image frame, and the second feature point group of the second image frame. The processor 110 may use the average vertical movement at each feature point included in the first and second feature point groups generated due to the driving of the vehicle to remove noise due to the vehicle's vibration during driving from the generated vertical movement graph. For example, the processor 110 may apply a lowpass filter to remove noise from the average value of vertical movement between the first and second feature point groups, but the present disclosure is not limited to the specific description.

The camera unit 116 may capture the scene around the vehicle. The camera unit 116 may capture the image including a speed bump present in the vehicle's driving direction.

The sensor unit 115 may determine the location of the vehicle. The sensor unit 115 may measure the location of the vehicle using GPS signals received from the Global Positioning System (GPS) satellites, but the present disclosure is not limited to the specific description. The sensor unit 115 may provide the location of the vehicle measured at regular intervals to the processor 110.

The communication unit 130 may transmit speed bump information generated by the processor 110 to the vehicle service providing server. The communication unit 130 may receive, from the vehicle service providing server, integrated speed bump information obtained by integrating speed bump information collected from a plurality of different vehicles.

The processor 110 may provide an alarm service based on the integrated speed bump information when a speed bump ahead of the vehicle includes physical irregularities. The vehicular electronic device may include a display unit or a speaker capable of providing an alarm service, but the present disclosure is not limited to a specific type of notification service.

The processor 110 may assess the proper operation of a speed bump detection function by referencing pre-stored map data and confirming the vehicle's proximity to an area with a speed bump. When a speed bump is identified from the image obtained by the camera unit 116, the processor 110 may determine whether the speed bump includes physical irregularities through the embodiment above.

The processor 110 may determine whether a speed bump is erroneously detected by using an object tracking model generated based on a machine learning technique. The object tracking model according to one embodiment may be either the centroid tracker or the Simple Online and Realtime Tracking (SORT).

FIGS. 13 and 14 are flow diagrams illustrating a method for controlling a vehicular electronic device according to one embodiment.

Referring to FIG. 13, a method for controlling a vehicular electronic device according to one embodiment may comprise capturing an image in front of a vehicle S310, detecting a speed bump for detecting a speed bump from the captured front image S320; obtaining information on the vehicle's location for obtaining the location information of the vehicle S330, generating location information of a speed bump for generating location information of the speed bump based on the obtained location information of the vehicle S340, generating speed bump information for determining whether the speed bump includes physical irregularities and generating speed bump information using at least one of information on whether the speed bump irregularities and information on the location of the speed bump S350, and transmitting speed bump information for transmitting the speed bump information to a vehicle service providing server S360.

In the step of image capturing S310, the camera unit may capture an image in front of the vehicle.

In the step of detecting a speed bump S320, the processor may detect a speed bump by processing an image captured by the camera unit.

In the step of obtaining location information S330, the processor may determine the vehicle's current location and calculate the location of the speed bump based on the vehicle's current location. In the step of generating location information of the speed bump S340, the processor may specify the location of the speed bump right before the vehicle passes the speed bump and generate location information of the speed bump.

In the step of generating speed bump information S350, the processor may determine whether the speed bump includes physical irregularities by measuring the degree of change between the first feature point group of an image frame right before the vehicle passes the speed bump and the second feature point group of an image frame after the vehicle passes the speed bump. In the step of generating speed bump information S350, the processor specify a first time point right before the vehicle crosses the speed bump based on the distance between the bounding box representing the boundary of the speed bump and a virtual point set at the front end of the vehicle's hood.

In the step of generating speed bump information S350, the processor may determine whether there is a vertical movement of the vehicle within a predetermined time period after the first time point. In the step of generating speed bump information S350, the processor may extract a plurality of feature points from the first image frame and the second image frame, compare the feature points of the first image frame and those of the second image frame, and set those matching feature points as reference points.

In the step of generating speed bump information S350, the processor may calculate an average value of the degree of vertical movement of the plurality of reference points and track the presence of a vertical movement pattern generated when the vehicle crosses a speed bump. In the step of generating speed bump information S350, in the presence of the vertical movement pattern, the processor may determine that the speed bump includes physical irregularities. In the step of generating speed bump information S350, the processor may generate speed bump information that includes at least one of information on the location of the speed bump and information on whether the speed bump includes physical irregularities.

In the step of transmitting speed bump information S360, the communication unit may transmit the speed bump information to the vehicle service providing server.

Referring to FIG. 14, a method for controlling a vehicular electronic device according to one embodiment may further comprise receiving integrated speed bump information for receiving, from the vehicle service providing server, integrated speed bump information obtained by integrating speed bump information collected from different vehicles S370, providing an alarm service for providing an alarm service based on the integrated speed bump information only when a speed bump in front of the vehicle is a first speed bump with physical irregularities S380, and determining erroneous detection for determining whether the detecting of the speed bump has erroneously detected a speed bump.

In the step of receiving integrated speed bump information S370, the communication unit may receive, from the vehicle service providing server, integrated speed bump information obtained by integrating speed bump information collected from different vehicles. In the step of providing an alarm service S380, the processor may provide an alarm service based on the integrated speed bump information only when the speed bump in front of the vehicle includes physical irregularities. A method for providing an alarm service may be visual or auditory, but the present disclosure is not limited to a specific type of implementation.

In the step of determining erroneous detection, the processor may track whether detection of a speed bump is correct based on a plurality of image frames captured by the camera unit. In the step of determining erroneous detection, the processor may determine whether a speed bump is erroneously detected by using an object tracking model generated based on a machine learning technique.

FIGS. 15 to 17 are conceptual drawings related to the operation of a vehicular electronic device according to one embodiment.

Referring to FIG. 15, the vehicular electronic device may detect a bounding box 400 for identifying a speed bump from a captured image of the road in front of a vehicle (a). The vehicular electronic device may set a virtual point P at one point of the vehicle's hood. The vehicular electronic device may detect a change in the distance between the bounding box 400 and the point P to determine the location of the speed bump. The vehicular electronic device may assess the proper operation of a speed bump detection function based on image frames included in the images captured while the vehicle approaches the location of the speed bump.

The vehicular electronic device may detect a change in the distance between the bounding box 400 and point P to specify the time right before the vehicle crosses a speed bump. The time right before the vehicle crosses the speed bump may be the time point C when point P overlaps the side of the bounding box 400 closest to the vehicle, but the present disclosure is not limited to the specific condition.

For example, when the coordinates of the virtual point is $P(x, y)$, the time point $t_0$, when the bounding box of the speed bump intersects the coordinates $P(x, y)$ of the virtual point, may be determined as the time point when the vehicle is about to step on the speed bump.

Referring to FIG. 16, a virtual point P may be set, but may not be limited, at an intersection point where the lower limit of field of view of the vehicular electronic device 100 meets the front end of the hood. The virtual point P is only one of criteria for specifying the time right before the vehicle 102 crosses the speed bump 400.

The designation of coordinates $P(x, y)$ for the virtual point may be intended to exclude scenarios where the vehicle avoids the speed bump 400 by reversing or executing evasive maneuvers such as driving through the shoulder. At $t_0$, a clearance distance may exist before the speed bump 400 makes contact with the front wheels of the vehicle, and the clearance distance may vary depending on the viewing angle at the mounting position of the vehicular electronic device (camera) or the overhang of each vehicle.

Referring to FIG. 17, the vehicular electronic device may compare a plurality of image frames captured by the camera unit with each other. The vehicular electronic device may determine the presence of irregularities on a speed bump during the time interval from $t_0$ when the vehicle starts to cross the speed bump to $t_n$ representing the predefined final time point. The vehicular electronic device may analyze each frame of the images between $t_0$ and the predefined final time point $t_n$.

The vehicular electronic device may compare the first frame $\text{img}_{t-1}$ 1710 of an image of the road in front of the vehicle captured at the first time point by the camera unit with the second frame $\text{img}_t$ 1720 of an image of the road in front of the vehicle captured at the second time point.

In FIG. 17, the drawing denoted as 1750 illustrates a matching relationship between the first feature point groups 1710-1 of the first frame $\text{img}_{t-1}$ 1710 and the second feature point groups 1720-1 of the second frame $\text{img}_t$ 1720.

Specifically, the vehicular electronic device according to one embodiment may determine the vehicle movement based on the detection of a difference between the first feature point groups 1710-1 extracted from the first frame $\text{img}_{t-1}$ 1710 and the second feature point groups 1720-1 extracted from the second frame $\text{img}_t$ 1720.

The first frame 1710 and the second frame 1720 may correspond to the frames captured at specific time points between $t_0$ and $t_n$. For example, the first frame 1710 may represent the frame at time t−1, while the second time frame 1720 may represent the frame at time t.

For example, the vehicular electronic device may extract feature points $f_{t-1}$ of the image frame 1710 at time t−1 and feature points $f_t$ of the image frame 1720 at time t.

The vehicular electronic device may compare the feature points $f_{t-1}$ of the image frame at time t−1 with feature points $f_t$ of the image frame at time t. For example, the vehicular electronic device may match $f_{t-1}$ to $f_t$ based on the equation $p_t = f_{t-1} \cap f_t$. The vehicular electronic device may use Oriented and FAST and Rotated BRIEF (ORB) features for tests, but the present disclosure is not limited to the specific example. The vehicular electronic device may perform feature matching using the Brute-Force Matcher (BFMater), but the present disclosure is not limited to the specific example.

The vehicular electronic device may set those matching feature points among a plurality of feature point groups 1710-1 from the first frame 1710 and a plurality of feature point groups 1720-1 from the second frame 1720 as reference points (f).

The vehicular electronic device may detect vertical movement of the plurality of reference points in the image. Positions of the plurality of reference points may vary for each image frame. The vehicular electronic device may track and quantify the vertical change of the plurality of reference points according to the frame change. The vehicular electronic device may calculate an average value of the degree of vertical change of the plurality of reference points. For example, the vehicle reference device may derive the average vertical movement $\overline{y}_t$ of the vehicle by using the equation $\overline{y}_t = \Sigma y_i / n$, $y_i \in p_t$. $p_t$ represents the feature point at time t, and $\overline{y}_t$ represents the average vertical movement of feature points between frames, which may be used for estimation of the vehicle's vertical movement. At this time, in the equation above, i represents the image frame number, and n represents the number of the last image frame.

Depending on the specific feature point, it may correspond to a moving object, such as a nearby vehicle or person, or to a stationary object, such as a tree or a building in the upper part of an image or a road in the lower part of the image; therefore, the average value along the y axis is calculated for all matched feature points in the image.

The vehicular electronic device may display the change in the average value of the degree of vertical change of a plurality of reference points as a graph. The vehicular electronic device may remove noise from the average value of the degree of vertical change of a plurality of reference points. For example, the vehicular electronic device may generate a graph of vertical movement of reference points by removing noise from the changes in the average value of the degree of vertical movement of a plurality of reference points by applying a low pass filter to the changes. In the reference point vertical movement graph, x axis may correspond to time, and y axis may correspond to height. The vehicular electronic device may remove noise due to the vehicle's vibration during driving based on the formula $h_t = a \cdot h_{t-1} + (1-a) - \overline{y}_t$, $0 < a < 1$, but the present disclosure is not limited to the specific description. $h_t$ represents the change in height when a vehicle passes a speed bump, which is a value obtained by removing noise from $\overline{y}_t$.

FIGS. 18 and 19 are graphs illustrating waveforms due to vertical movement an image captured by a vehicular electronic device according to one embodiment.

Referring to FIG. 18, (a) shows the average value $\overline{y}_t$ of y axis coordinates, and (b) shows $h_t$. The figure shows that $h_t$ exhibits significantly reduced noise compared to $\overline{y}_t$. Referring to FIG. 19, variation in the $h_t$ value may be checked when an actual vehicle passes a speed bump during driving. The vertical movement pattern generated when the vehicle crosses a speed bump may have an M shape. The above specific pattern may be frequently observed when a speed bump is equipped with irregularities, leading to an increase and subsequent decrease in the pitch angle of a vehicle. The vehicular electronic device may detect the vertical movement pattern from $h_t$ and determine whether the corresponding speed bump is equipped with irregularities. If the M-shaped pattern is detected, the vehicular electronic device may determine that the detected speed bump is an actual speed bump equipped with irregularities. If the M-shaped pattern is not detected, the vehicular electronic device may determine that the detected speed bump does not have irregularities. The vehicular electronic device may generate speed bump information related to the location of the speed bump and whether the speed bump includes irregularities.

The vehicular electronic device may receive integrated speed bump information obtained by integrating speed bump information provided by a plurality of vehicular electronic devices from the vehicle service providing server. The vehicular electronic device may provide a notification service when an actual speed bump is detected in front of the vehicle based on integrated speed bump information.

FIGS. 20 and 21 are flow diagrams illustrating a method for controlling a vehicular electronic device according to one embodiment.

Referring to FIG. 20, a vehicular electronic device may analyze an image and identify a speed bump within the image S501. The vehicular electronic device may track the presence of a speed bump within images obtained during the driving of the vehicle S502. The vehicular electronic device may continuously evaluate the accuracy of speed bump identification. Through the tracking of the speed bump, the vehicular electronic device may detect a speed bump within an image S503.

The vehicular electronic device may specify a time point $t_0$ at which a speed bump is not identified within the image and extract feature points from the frame at that time point S504. The vehicular electronic device may extract feature points by analyzing a plurality of image frames from the moment the vehicle steps on a speed bump. For example, the vehicular electronic device may compare the frame at time $t_0$ with the frame at time t+1, which is the next frame S505. The vehicular electronic device may extract feature points from the frame at time t+1 S506. The vehicular electronic device may match feature points within the frame at time $t_0$ with feature points within the next frame at time t+1 S507.

The vehicular electronic device may calculate the average vertical movement of the reference points, which are matched feature points S508. The vehicular electronic device may remove noise due to the vehicle's vibration during driving from the average vertical movement of the reference points using a low pass filter (LPF) S509.

The vehicular electronic device may determine the presence of a vertical movement of the vehicle within a predetermined time period right before the vehicle crosses a speed bump. From the vertical movement graph of the reference point, the vehicular electronic device may track the presence or absence of a vertical movement pattern generated during a predetermined time interval from the time right before the vehicle crosses the speed bump to the moment the vehicle crosses the speed bump S510. A vertical movement pattern generated when the vehicle crosses a speed bump may have an M shape. When the vertical movement pattern is detected S511, the vehicular electronic device may identify the speed bump as a first speed bump equipped with irregularities S513. When the vertical movement pattern is not detected within a predetermined time period S512, the vehicular electronic device may identify the speed bump as a second speed bump that does not have irregularities S514.

Referring to FIG. 21, when a speed bump is found in a captured image, the vehicular electronic device may provide a notification service only for speed bumps including irregularities based on integrated speed bump information S601. The vehicular electronic device may proceed with the determination of whether a speed bump includes irregularities the moment the vehicle crosses the speed bump S602. The vehicular electronic device may accumulate and store speed bump information, which is a result value obtained from the determination of whether the speed bump includes irregularities S603. The vehicular electronic device may transmit the accumulated and stored speed bump information to the server S604. The server may integrate the speed bump information S605 and transmit the integrated information to the vehicular electronic device S606. The vehicular electronic device may update the integrated speed bump information through continuous communication with the server and provide updated information to the driver.

Throughout the document, preferred embodiments of the present disclosure have been described with reference to appended drawings; however, the present disclosure is not limited to the embodiments above. Rather, it should be noted that various modifications of the present disclosure may be made by those skilled in the art to which the present disclosure belongs without leaving the technical scope of the present disclosure defined by the appended claims, and these modifications should not be understood individually from the technical principles or perspectives of the present disclosure.

[Detailed Description of Main Elements]

| | |
|---|---|
| 100: Vehicular electronic device | 200: Vehicle service providing server |
| 300: User terminal | 110: Processor |
| 115: Sensor unit | 116: Camera unit |
| 130: Communication unit | |

What is claimed is:

1. A method for controlling an electronic device of a vehicle, the method comprising:
  capturing an image in front of the vehicle;
  detecting a speed bump from the captured image;
  obtaining information on a location of the vehicle when the speed bump is detected;
  generating location information of the speed bump based on the obtained location information on the vehicle;
  determining whether the speed bump includes irregularities;
  generating speed bump information using at least one of information on whether the speed bump includes irregularities and information on a location of the speed bump; and
  transmitting the speed bump information from the vehicle to a vehicle service providing server,
  wherein the generating of the speed bump information includes specifying a first time point right before the vehicle crosses the speed bump based on a distance between a bounding box representing a boundary of the speed bump and a virtual point set at a front end of the vehicle.

2. The method of claim 1, wherein the generating of the speed bump information further includes determining whether there is a vertical movement of the vehicle within a predetermined time period after the first time point.

3. The method of claim 1, wherein the generating of the speed bump information further includes:
  extracting a plurality of feature points from each of a first image frame and a second image frame;
  comparing feature points of the first image frame and feature points of the second image frame; and
  setting a plurality of matching feature points as reference points.

4. The method of claim 3, wherein the generating of the speed bump information further includes:
  calculating an average value of a degree of vertical movement of the reference points; and
  tracking a presence of a vertical movement pattern generated when the vehicle crosses the speed bump,
  wherein the irregularities in the speed bump are determined based on the presence of the vertical movement pattern.

5. The method of claim 1, further comprising:
  receiving, from the vehicle service providing server, integrated speed bump information obtained by integrating speed bump information collected from a plurality of different vehicles.

6. The method of claim 5, further comprising:
  providing an alarm service based on the integrated speed bump information when the speed bump in front of the vehicle includes the irregularities.

7. The method of claim 1, further comprising determining whether there is an error in the detecting of the speed bump.

8. An electronic device of a vehicle, the electronic device comprising:
  a camera configured to capture an image in front of the vehicle;
  a sensor configured to determine a location of the vehicle;
  a processor configured to detect a speed bump from the image in front of the vehicle by processing the image, determine whether the speed bump includes irregularities after the vehicle passes the speed bump, and generate speed bump information using at least one of information on a location of the speed bump and information on whether the speed bump includes irregularities; and
  a transceiver configured to transmit the speed bump information from the vehicle to a vehicle service providing server,
  wherein the processor is further configured to specify a first time point right before the vehicle crosses the speed bump based on a distance between a bounding box representing a boundary of the speed bump and a virtual point set at a front end of the vehicle.

9. The electronic device of claim 8, wherein the processor is further configured to determine whether there is a vertical movement of the vehicle within a predetermined time period after the first time point.

10. The electronic device of claim 8, wherein the processor is further configured to:
  extract a plurality of feature points from each of a first image frame and a second image frame;
  compare feature points of the first image frame and feature points of the second image frame; and
  set matching feature points as a plurality of reference points.

11. The electronic device of claim 10, wherein the processor is further configured to:
  calculate an average value of a degree of vertical movement of the plurality of reference points; and
  track a presence of a vertical movement pattern generated when the vehicle crosses the speed bump,
  wherein the irregularities in the speed bump are determined based on the presence of the vertical movement pattern.

12. The electronic device of claim 10, wherein the transceiver is further configured to receive, from the vehicle service providing server, integrated speed bump information obtained by integrating speed bump information collected from a plurality of different vehicles.

13. The electronic device of claim 12, wherein the processor is further configured to provide an alarm service based on the integrated speed bump information when the speed bump in front of the vehicle includes the irregularities.

14. The electronic device of claim 8, wherein the processor is further configured to calculate the location of the speed bump based on the location of the vehicle determined by the sensor and the image captured by the camera.

15. The electronic device of claim 8, wherein the processor is further configured to determine whether the detection of the speed bump is correct while the vehicle is approaching the speed bump.

16. The electronic device of claim 15, wherein the processor is further configured to determine whether a speed bump is erroneously detected by using an object tracking model generated based on a machine learning technique.

17. The electronic device of claim 16, wherein the object tracking model is either one of a centroid tracker and a Simple Online and Realtime Tracking (SORT).

18. The electronic device of claim 16, wherein the processor uses an object detection model generated based on a machine learning technique in detecting the speed bump through image processing, wherein the object detection model is at least one of a single shot multibox detector (SSD) and a you only look once (YOLO) detector.

\* \* \* \* \*